(12) United States Patent
Keune

(10) Patent No.: US 11,866,204 B2
(45) Date of Patent: Jan. 9, 2024

(54) THERMAL CONTROL SYSTEM FOR REENTRY VEHICLES

(71) Applicant: Science Applications International Corporation, Reston, VA (US)

(72) Inventor: Tosh Alan Keune, Germantown, MD (US)

(73) Assignee: Science Applications International Corporation, Reston, VA (US)

( * ) Notice: Subject to any disclaimer, the term of this patent is extended or adjusted under 35 U.S.C. 154(b) by 129 days.

(21) Appl. No.: 17/536,450

(22) Filed: Nov. 29, 2021

(65) Prior Publication Data

US 2023/0166872 A1    Jun. 1, 2023

(51) Int. Cl.
*B64G 1/58* (2006.01)
*B64G 1/62* (2006.01)
*B64G 1/14* (2006.01)
*B64G 1/40* (2006.01)

(52) U.S. Cl.
CPC .............. *B64G 1/58* (2013.01); *B64G 1/14* (2013.01); *B64G 1/401* (2013.01); *B64G 1/623* (2023.08)

(58) Field of Classification Search
CPC ............. B64G 1/58; B64G 1/62; B64G 1/401
See application file for complete search history.

(56) References Cited

U.S. PATENT DOCUMENTS

| | | | | |
|---|---|---|---|---|
| 3,113,750 A | * | 12/1963 | Beardsley | F22B 37/475 244/159.1 |
| 3,140,064 A | * | 7/1964 | Gengelbach | F01K 15/00 244/58 |
| 3,410,502 A | * | 11/1968 | Leadon | B64G 1/58 244/164 |
| 4,605,184 A | * | 8/1986 | Kim | B64G 1/58 165/44 |
| 4,923,146 A | * | 5/1990 | Anthony | B64C 1/38 244/119 |
| 5,129,599 A | * | 7/1992 | Wollen | F17C 9/02 60/671 |
| 5,135,184 A | * | 8/1992 | Billig | B64G 1/402 244/62 |
| 8,191,616 B2 | * | 6/2012 | Behrens | B64C 1/40 165/41 |
| 8,215,589 B2 | * | 7/2012 | Janeke | B64G 1/62 244/158.9 |
| 8,727,283 B2 | * | 5/2014 | Morris | B64G 1/002 244/171.1 |

(Continued)

*Primary Examiner* — Joseph W Sanderson
(74) *Attorney, Agent, or Firm* — Banner & Witcoff, Ltd.

(57) ABSTRACT

A thermal control system may transfer energy (directly or after a delay) to a thrusting device that can be used to slow a reentry vehicle entering a gaseous atmosphere from orbit. The thermal control system may mitigate the heating of the vehicle by transferring heat generated by the viscous interaction between the vehicle and high-altitude portions of a planetary atmosphere to a working fluid. This working fluid may then be routed through and/or ejected through one or more nozzles aligned to produce thrust in a direction that opposes the forward motion of this vehicle. This counter thrust may help to slow the reentry vehicle and reduce the amount of kinetic energy that can be converted into thermal energy. The working fluid may also be stored to use for propulsion after the reentry vehicle slows below hypersonic velocities.

14 Claims, 14 Drawing Sheets

(56) References Cited

U.S. PATENT DOCUMENTS

| | | | |
|---|---|---|---|
| 10,371,098 B2* | 8/2019 | Roz | F02K 9/44 |
| 10,473,405 B2* | 11/2019 | Levy | B64G 1/58 |
| 10,618,636 B2* | 4/2020 | Mehring | B64C 21/06 |
| 2008/0217481 A1* | 9/2008 | Janeke | B64G 1/62 |
| | | | 244/171.1 |
| 2010/0038051 A1* | 2/2010 | Behrens | F28F 13/003 |
| | | | 165/41 |
| 2012/0312927 A1* | 12/2012 | Morris | B64G 1/12 |
| | | | 244/171.1 |
| 2016/0332724 A1* | 11/2016 | Mehring | B64C 21/06 |
| 2018/0057191 A1* | 3/2018 | Zhang | F42B 10/38 |
| 2018/0080719 A1* | 3/2018 | Levy | F28D 15/06 |
| 2019/0309996 A1* | 10/2019 | Chancery | F25B 9/02 |
| 2022/0204190 A1* | 6/2022 | Alhubail | B64G 1/62 |

\* cited by examiner

THERMAL CONTROL SYSTEM FOR REENTRY VEHICLES

BACKGROUND

A vehicle entering (or re-entering) a planetary atmosphere may be subjected to extreme high temperatures to reduce the energy in its orbital velocity and altitude for the flight conditions needed to land safely. To avoid or reduce damage to that vehicle, a thermal control system may be used. Concepts in use for current thermal control systems for a reentry vehicle suitable for human spaceflight include: placing a thick layer of minimally thermally conductive material that will ablate under extreme heating thus removing heat from the vehicle; wrapping the vehicle in foam and thermal blanket materials; or placing the vehicle behind a series of partially inflated ballutes.

SUMMARY

This Summary is provided to introduce a selection of some concepts in a simplified form as a prelude to the Detailed Description. This Summary is not intended to identify key or essential features.

A reentry vehicle may comprise a main body configured for non-destructive reentry into a planetary atmosphere. The reentry vehicle may also include a thermal control system that includes a heat exchanger, one or more output nozzles, and one or more fluid paths configured to transfer heated fluid from the heat exchanger to the one or more output nozzles. The heat exchanger may comprise one or more fluid channels positioned to transfer heat, from an exterior of the main body during the non-destructive reentry, to a working fluid in the one or more fluid channels. The one or more output nozzles may be positioned so that heated fluid output via the one or more output nozzles creates thrust in a direction that opposes forward motion of the vehicle. The one or more fluid paths may comprise a tank for heated working fluid and a pump between the tank and the one or more nozzles. The reentry vehicle may also comprise one or more tanks configured to store unheated working fluid for delivery to the heat exchanger and a pump between the one or more tanks and the heat exchanger.

An extendable plenum may couple the heat exchanger to the main body. The extendable plenum may comprise a retracted configuration in which the heat exchanger is proximate the main body and an extended configuration in which the heat exchanger is displaced from the main body. The one or more fluid channels of the heat exchanger may be positioned in proximity to a vehicle surface on the forward portion of the main body and the one or more output nozzles may be positioned to create thrust in a direction that opposes forward motion of the vehicle.

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

Aspects of the present technology differ from known structures and processes in various respects. As some examples, aspects of the present technology may include a thermal control system that mitigates aerodynamic friction heating of a vehicle entering a gaseous atmosphere from orbit. The thermal control system may provide a means of transferring energy (directly or after a delay) to a thrusting device that can be used to slow the reentry vehicle faster than friction forces can, and/or that energy can be stored briefly to later propel the reentry vehicle to a safe powered landing at any location within range. The thermal control system may mitigate the heating of the vehicle by transferring heat generated by the viscous interaction between the vehicle and high-altitude portions of a planetary atmosphere to a working fluid. This working fluid may then be routed through and/or ejected through one or more nozzles aligned to produce thrust in a direction that opposes the forward motion of this vehicle. This counter thrust may help to slow the reentry vehicle and reduce the amount of kinetic energy that must be converted into thermal energy. The working fluid may also be stored to use for propulsion after the reentry vehicle slows below hypersonic velocities.

This thermal control system is intended to provide a safer, more robust approach to reentry vehicle thermal control. Some or all active components may be redundant, thus allowing this thermal protection to withstand one or more critical failures during reentry. The thermal control system may provide a coupled reentry temperature control/thermal protection and propulsion/retrograde thrusting to the reentry vehicle.

Figure 1:
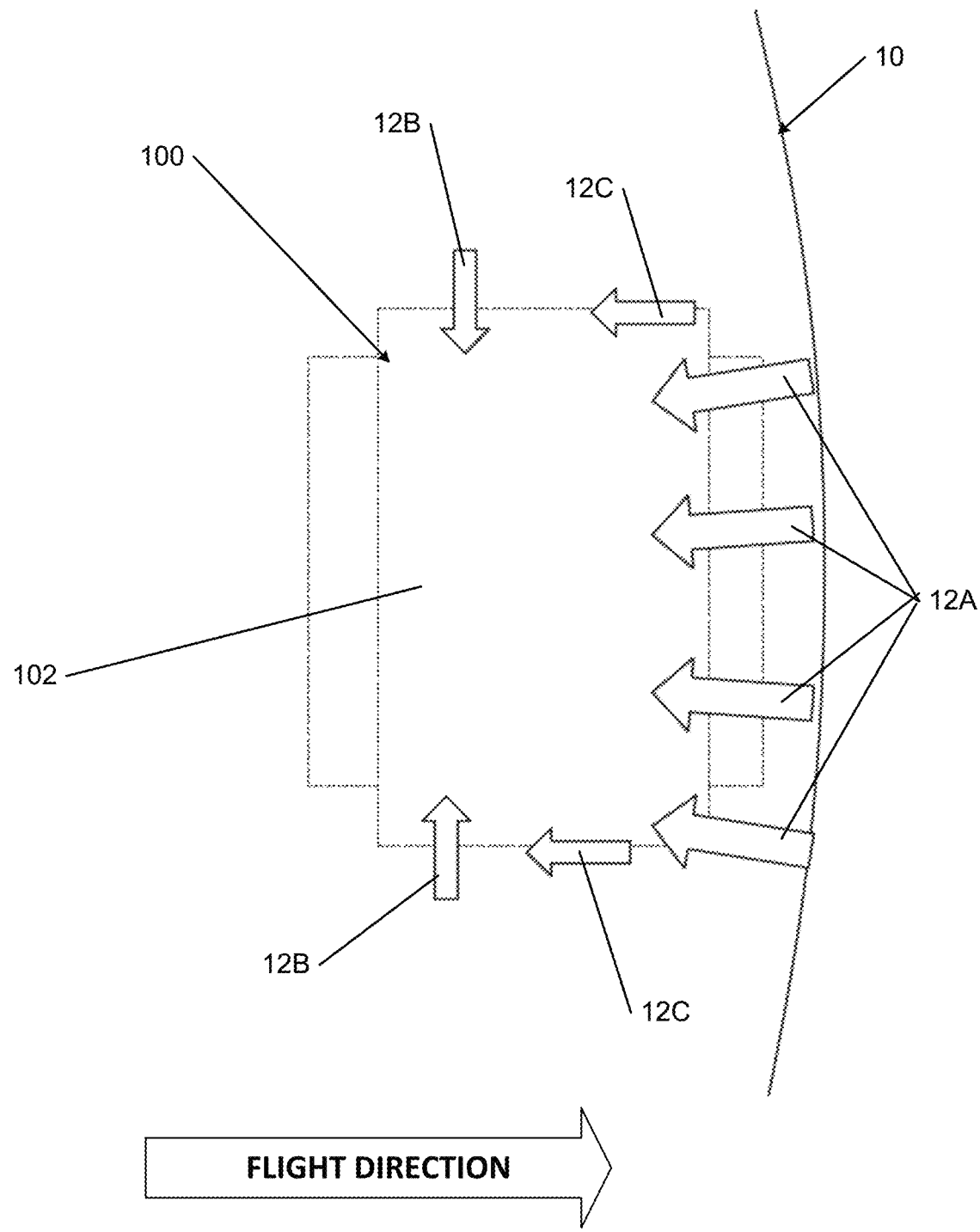
FIG. 1 is a side profile view of a reentry vehicle.

FIG. 1 is a side profile view of an example reentry vehicle 100 as it enters the atmosphere. The reentry vehicle 100 may include a main body 102. The main body 102 could be, for example, a self-contained structure or hull. The main body 102 may have one or more internal compartments. The main body 102 may be pressurized/pressurizable (e.g., to sustain human life or transport sensitive cargo(s)). The main body 102 may have heating shielding/protection. The main body 102 may be configured for non-destructive reentry into a planetary atmosphere. Non-destructive reentry may comprise, for example, the ability to withstand forces/temperatures associated with re-entry and maintain structural integrity. The main body 102 may comprise, for example, some level of heat shielding or other components to withstand forces/temperatures associated with reentry and maintain structural integrity.

The reentry vehicle 100 and main body 102 may travel through the planetary atmosphere, from higher to lower altitude, starting reentry at a velocity with a small increment less than the stable orbital velocity at the designated orbital altitude, with a starting velocity of at least 7,500 meters/second (m/s), with a potential range of velocities of approximately 7,500 m/s down to approximately 1,700 m/s (Mach 5) (depending on local ambient temperatures). Once the velocity gets to below 1,700 m/s (Mach 5), the reentry vehicle 100 may continue to decelerate, but may not suffer destructive heating. After the reentry vehicle 100 is moving slowly enough, a parachute may be deployed for final descent. The reentry vehicle 100 and main body 102 may also be subjected to temperatures/ranges of temperatures of at least 250° F., with a potential range of temperatures of 250° F. to 2550° F.

The reentry of the reentry vehicle 100 may comprise reentry into atmosphere from out of atmosphere (e.g., from orbit). The reentry of the reentry vehicle 100 may comprise travel through the atmosphere from higher altitudes (e.g., altitudes at edge of space) to lower altitudes. The planetary atmosphere may be Earth atmosphere, and/or may be an atmosphere of another planet or planetary body (e.g., Mars, moons of outer planets, etc.).

As illustrated in FIG. 1, a bow shock 10 may be created when the reentry vehicle 100 is travelling through the atmosphere. The arrows in FIG. 1 illustrate how kinetic energy (from movement of the vehicle 100 in the indicated flight direction) is converted into heat 12A, 12B, 12C that is transferred to the vehicle 100. A large portion of heat transferred to the vehicle 100 may be created by the bow shock 10. The transfer rates of heat 12A, 12B, 12C from the bow shock 10 may be a function of the bow shock 10 location with respect to the reentry vehicle 100. For example, the transfer of energy 12A at the front of the reentry vehicle 100 may be largest. Generally, the energy transfer 12B may be a lower transfer to the sides of the reentry vehicle 100 from the post shock atmosphere. Additionally, conduction from stagnation points of the lower transfer rates 12C increases temperatures along the surfaces of the reentry vehicle 100. Based on this energy and heat transfer to the reentry vehicle 100, a thermal control system is needed to mitigate aerodynamic friction heating of a vehicle entering the atmosphere from orbit. As described herein, a thermal control system may provide the advantage of coupling both thermal protection and propulsion for the reentry vehicle 100 entering the atmosphere from orbit.

Figure 2:
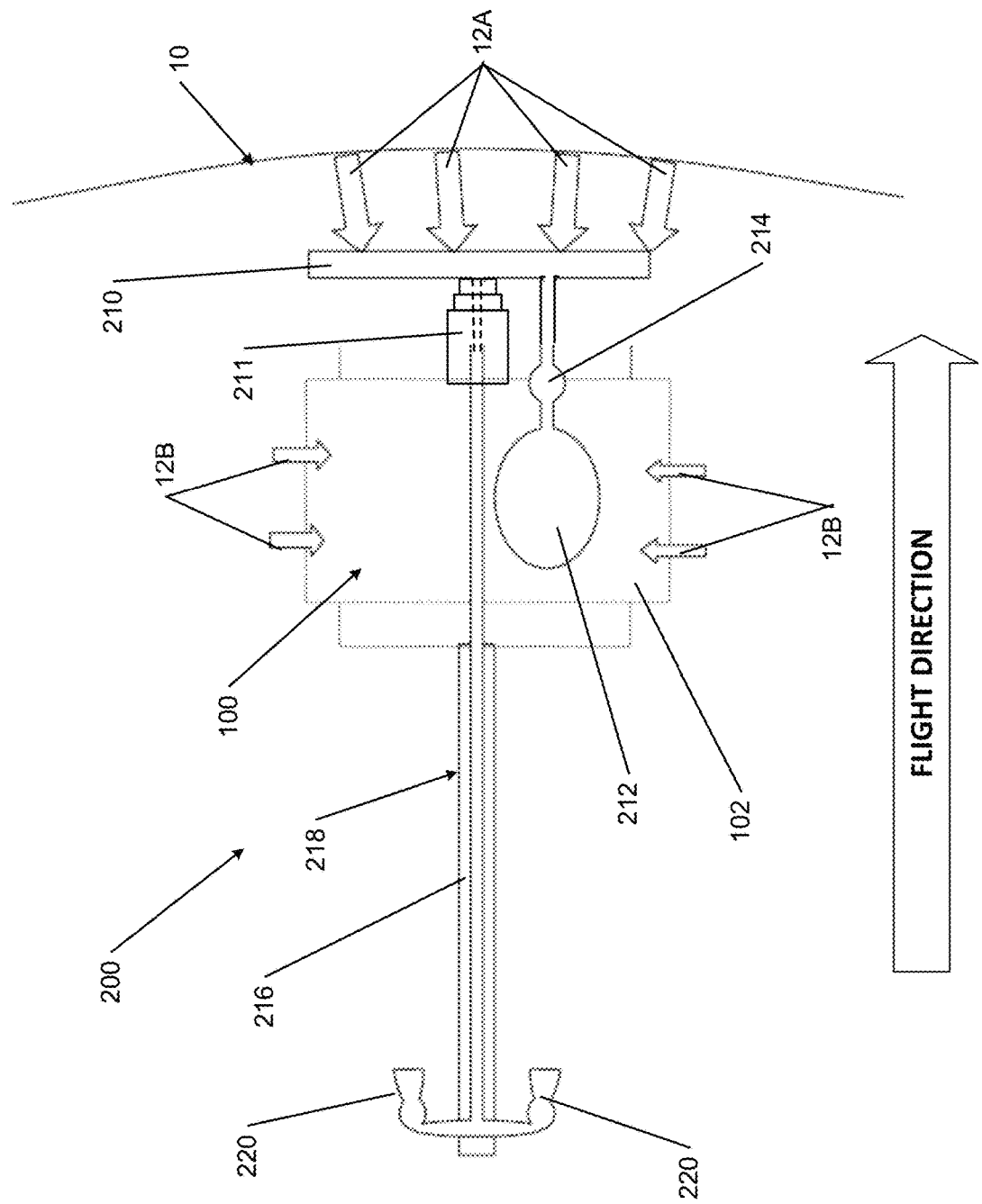
FIG. 2 is a side profile view showing an example reentry vehicle with a heat exchanger and an extendable plenum in a retracted configuration.
Figure 3:
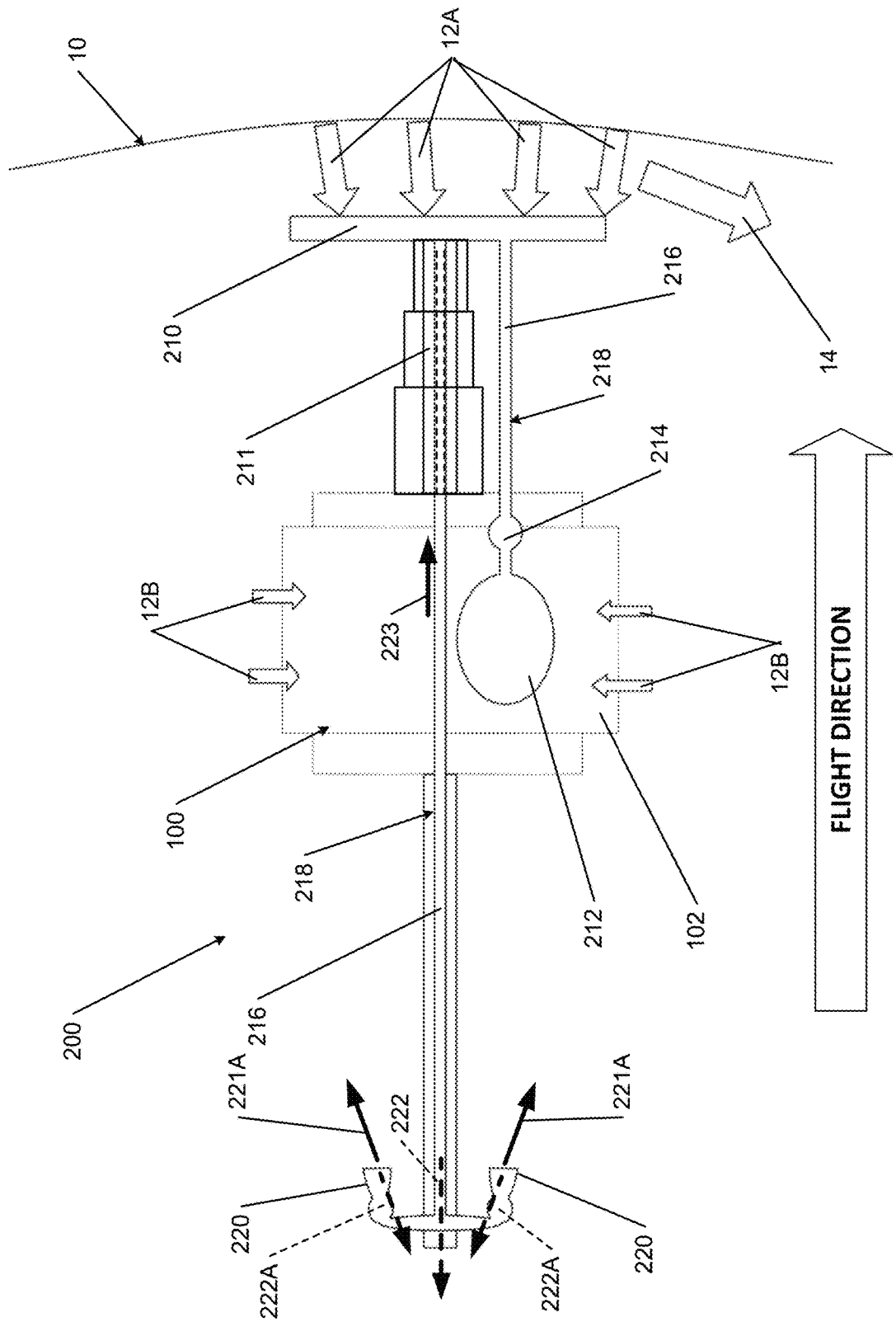
FIG. 3 is a side profile view of the reentry vehicle of FIG. 2 with the heat exchanger and extendable plenum in an extended configuration.

FIGS. 2 and 3 illustrate an exemplary embodiment of a thermal control system 200 to mitigate aerodynamic friction heating of a reentry vehicle 100 entering the atmosphere from orbit. The thermal control system 200 couples both thermal protection and propulsion for the reentry vehicle 100. The reentry vehicle 100 shown and illustrated in FIGS. 1-3 may, for example, comprise a space capsule. Other types of reentry vehicles may comprise and utilize a thermal control system such as the thermal control system 200.

The thermal control system 200 may include and use a dedicated heat exchanger 210 that deploys in front of the vehicle along a flight path vector at sufficient distance to minimize heat transfer to the main body 102. The heat transfer minimization may occur in the viscous interaction region (flight altitudes from 55 km to 91 km) and at hypersonic speeds. Before reentry, the heat exchanger 210 may be filled with a working fluid. The working fluid may freeze if on-orbit timing and vehicle attitude and altitude allows the freezing. Generally, a frozen working fluid may increase the amount of heat the initial mass of working fluid absorbs before reaching a design heat exchange exit temperature. If frozen, the working fluid may absorb the heat of fusion before heating up to the working fluid's design temperature and pressure. Additionally, freezing is not critical to the operation and may be a refinement that can further reduce the amount of mass needed to dissipate the heat generated by conversion from the kinetic and potential energy of the reentry vehicle 100 at reentry insertion. As the initial working fluid load reaches the design exhaust temperature, the heated working fluid is moved to the next step in the heating/thrust process. In this step, the working fluid may either be moved or directed to one or more rocket nozzles pointed in a direction to produce thrust opposing vehicle velocity, stored in a thermally isolated reservoir for later propulsive use, and/or released through nozzles embedded in the vehicle skin that produce retrograde thrust and inject relatively cool mass into the inner most layers of the viscous flow surrounding the reentry vehicle 100. A combination of any or all of these options may be utilized with the thermal control system 200.

FIG. 2 is a partially schematic side profile view of a reentry vehicle 100 with a thermal control system 200 that includes a heat exchanger 210 and an extendable plenum 211 coupling the heat exchanger 210 to the main body 102. The extendable plenum 211 may comprise a retracted configuration (as illustrated in FIG. 2) and an extended configuration (as illustrated in FIG. 3). The extendable plenum 211 may be a telescoping structure as illustrated in FIGS. 2 and 3. Other extendable structures may be utilized for the extendable plenum 211. In the retracted configuration, the heat exchanger 210 may be proximate the main body 102. In the extended configuration the heat exchanger 210 may be displaced and deployed from the main body 102. The thermal control system 200 may also include one or more storage tanks 212, one or more pumps 214, a working fluid 216 travelling through one or more fluid paths 218, and one or more nozzles 220. The heat exchanger 210 may comprise one or more fluid channels to transfer heat from an exterior of the main body 102 during the non-destructive reentry of the reentry vehicle 100. The one or more fluid channels from the heat exchanger 210 may transfer heat to a working fluid 216 in the one or more fluid channels. The one or more fluid paths 218 may be configured to transfer heated fluid from the one or more fluid channels to the one or more output nozzles 220.

As illustrated in FIG. 2, the reentry vehicle 100 may be entering the atmosphere from orbit, with a bow shock 10 created when the reentry vehicle 100 is travelling through the atmosphere. As was described above with respect to FIG. 1, the bow shock 10 may impart transfer heat 12A, 12B, 12C to the reentry vehicle 100. The transfer rates of heat 12A, 12B, and 12C from the bow shock 10 may be a function of the bow shock 10 location with respect to the reentry vehicle 100. For example, the transfer of heat 12A at the front of the reentry vehicle 100 may be largest. Generally, the heat transfer 12B may be a lower transfer to the sides of the reentry vehicle 100 from the post shock atmosphere. The proximity to the bow shock 10 may likely increase the heat transfer 12A, 12B, 12C to the reentry vehicle 100 and the heat exchanger 210.

FIG. 3 is a partially schematic side profile view of the reentry vehicle 100 with the heat exchanger 210 deployed via the extendable plenum 211. As stated above, the heat exchanger 210 may deploy in front of the reentry vehicle 100 along the flight path vector. The heat exchanger 210 may deploy via the extendable plenum 211 at a sufficient distance to displace the bow shock 10 from the main body 102 and thereby reduce heat transfer to the main body 102 in the viscous interaction region at hypersonic speeds. For example, the heat exchanger 210 may deploy at fight altitude from 55 km to 91 km. The heat exchanger 210 may be connected to the storage tank 214. The storage tank 214 may store a working fluid 216 that may be kept at an unheated or cool state. The working fluid 216 may be water. Distilled water may be the most likely and environmentally friendly working fluid 216 for the thermal control system 200. The working fluid 216 may comprise other fluids, such as any fluid with longer chain hydrocarbons or bio-carbons (sugar water). The working fluid 216 may also comprise gray water (mostly water with some contaminates). In one exemplary embodiment, the vehicle 100 may travel to a space station with a load of clean water and then exchange that clean water for used or gray water, which may then be used as the working fluid 216 for the vehicle reentry. The working fluid 216 in the heat exchanger 210 may freeze if on-orbit timing and vehicle attitude and altitude allows the freezing. The working fluid 216 may be pumped and directed to the heat exchanger 210 by one or more pumps 214. Although not shown in FIG. 3, the one or more pumps 214 may deliver the working fluid 216 to the heat exchanger 210 via the plenum 211 (e.g., a conduit between the pump(s) 214 and the heat exchanger 210 may be located within the plenum 211). As the cold working fluid 216 moves through the heat exchanger 210, the heat transfer cools the heat exchanger 210 and heats the working fluid 216. The heat exchanger 210 is intended to transfer incoming heat to the working fluid 216 flowing through the heat exchanger 210. A portion of the working fluid 216 may be sprayed 14 (e.g., released from the heat exchanger 210) into post shock region to absorb additional heat. The one or more pumps 214 may further deliver and push the heated working fluid 216 from the heat exchanger 210 to the one or more nozzles 220.

The one or more output nozzles 220, which may be thrusting devices and/or rocket nozzles that convert the working fluid 216 into thrust to reduce velocity of the reentry vehicle 100, may be connected so that the heated fluid is output from the nozzles 220. The heated fluid may, e.g., be output in directions indicated by the mass flow vectors 221A. Those directions may be partially outward from a centerline of the vehicle 100 so as to reduce the amount of heated fluid directed toward the main body 102. Reaction forces resulting from flow of heated fluid from the nozzles 220 may create thrust vectors 222A in directions opposite to directions of the mass flow vectors 221A. The thrust vectors 222A may combine to result in a net thrust vector 222 (e.g., components of the vectors 222A in a same direction may add, components of the vectors 222A in opposing directions may subtract and/or cancel out). The net thrust vector 222 may have a component directed opposite a direction 223, representing the forward motion of the reentry vehicle 110, and away from the main body 102. The direction 223 may, for example, comprise a direction from a center-of-mass of the vehicle 100 toward a location on an outermost part of the heat exchanger 210 and/or may coincide with the flight direction. The component of the net thrust vector 222 directed opposite to the direction 223 may represent the entire magnitude of the net thrust vector 222 (e.g., as indicated in FIG. 3) or may represent less than that entire magnitude. The net thrust vector 222 may reduce the amount of velocity dissipated through body friction of the reentry vehicle 100. The net thrust vector 222 may completely reduce the amount of velocity dissipated through body friction of the reentry vehicle 100.

The thermal control system 200 may comprise various backup devices in case any active components, like pumps, valves, nozzles, sensors, and selected portions of the thermal control system 200 fail. The thermal control system 200 may include multiple provisions supporting these redundant components. Any active component in the thermal control system 200 can be configured to have a duplicate, parallel, or otherwise redundant operation. This redundancy may help to render atmospheric entry as safe as intercontinental air travel. These backup/redundant components may be sized to present sufficient reserve capacity in order to allow the thermal control system 200 to continue operating at the same level of protection after one or more failures. The thermal control system 200 may also include system control software on redundant computer platforms using software designed for high reliability mission critical operation to extend redundancy to the thermal control system 200. Additionally, the thermal control system 200 may also include parallel or redundant sensors that may drive the thermal control system 200 in the event of a failure of any of these components.

FIGS. 4, 5A, 5B, and 5C illustrate additional exemplary embodiments of a thermal control system for a reentry vehicle 110 for reentering the atmosphere from orbit. The thermal control system 400 may mitigate aerodynamic friction heating of the reentry vehicle 110 entering the atmosphere in orbit. The thermal control system 400 couples both thermal protection and propulsion for the reentry vehicle 110. The reentry vehicle 110 shown and illustrated in FIGS. 4, 5A, 5B, and 5C may comprise a space shuttle-type space craft. Other reentry vehicles may comprise and utilize a thermal control system such as the thermal control system 400.

Similar to the reentry vehicle 100 described above for FIGS. 1-3, the reentry vehicle 110 may include a main body 112. The main body 112 could be, for example, a self-contained structure or hull. The main body 112 may have one or more internal compartments. The main body 112 may be pressurized/pressurizable (e.g., to sustain human life or transport sensitive cargos). The main body 112 may have heating shielding/protection. The main body 112 may be configured for non-destructive reentry into a planetary atmosphere. Non-destructive reentry may comprise, for example, the ability to withstand forces/temperatures associated with re-entry and maintain structural integrity. The main body 112 may comprise, for example, some level of heat shielding or other components to withstand forces/temperatures associated with reentry and maintain structural integrity. The reentry vehicle 110 and main body 112 may travel through the planetary atmosphere, from higher to lower altitude, at velocities similar to those described above and/or may be subjected to temperatures similar to those described above.

The reentry vehicle 110 and main body 112 may travel through the planetary atmosphere, from higher to lower altitude, starting reentry at a velocity with a small increment less than the stable orbital velocity at the designated orbital altitude, with a starting velocity of at least 7,500 meters/second (m/s), with a potential range of velocities of approximately 7,500 m/s down to approximately 1,700 m/s (depending on local ambient temperatures). The reentry vehicle 110 and main body 112 may also be subjected to temperatures/ranges of temperatures of at least 250° F., with a potential range of temperatures of 250° F. to 2550° F.

The reentry of the reentry vehicle 110 may comprise reentry into atmosphere from out of atmosphere (e.g., from orbit). The reentry of the reentry vehicle 110 may comprise travel through the atmosphere from higher altitudes (e.g., altitudes at edge of space) to lower altitudes. The planetary atmosphere may be Earth atmosphere, and/or may be an atmosphere of another planet or planetary body (e.g., Mars, moons of outer planets, etc.).

Figure 4:
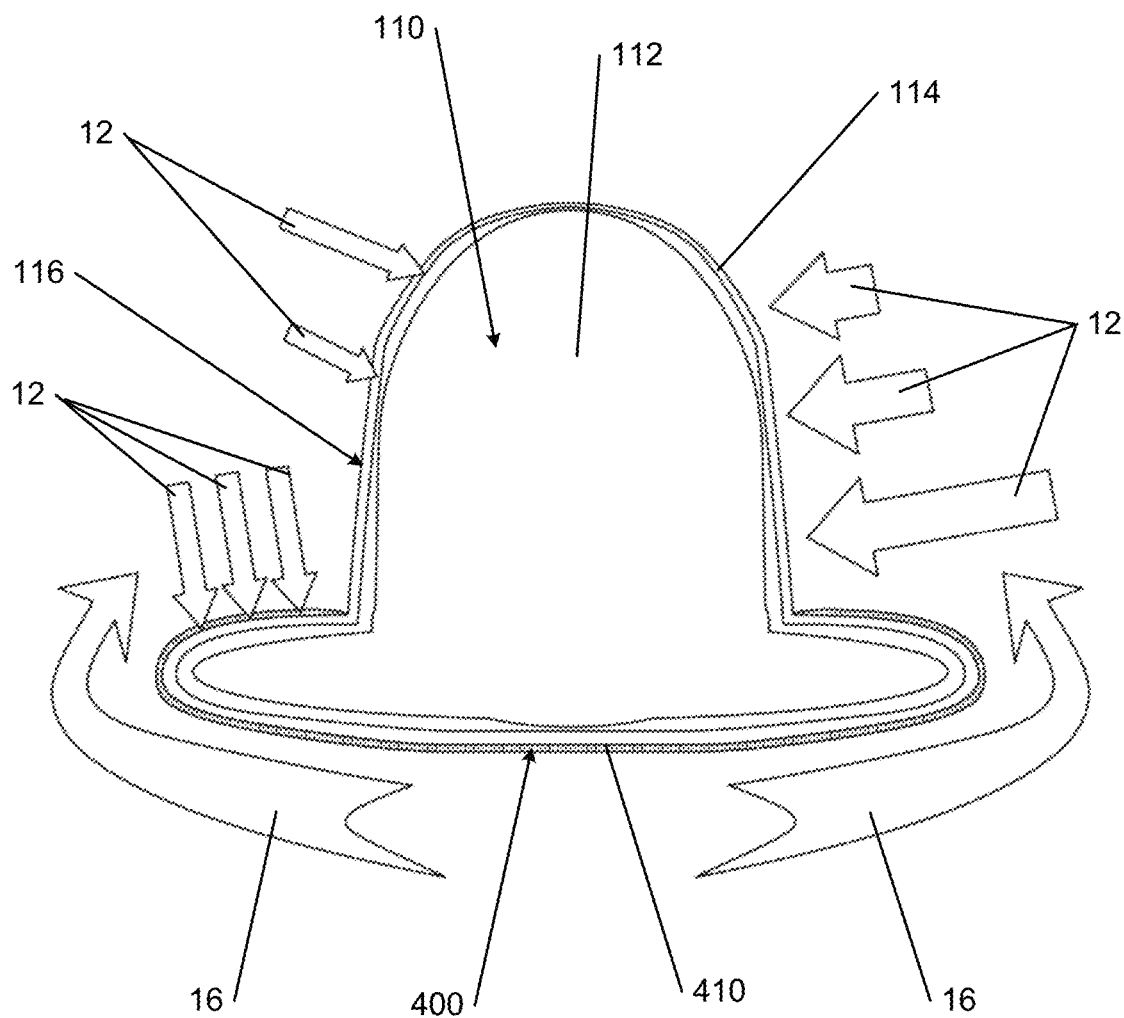
FIG. 4 is a front cross-sectional view showing another example reentry vehicle.

FIG. 4 illustrates a front cross-sectional view of the reentry vehicle 110. The reentry vehicle 110 may include both the main body 112 and a protected vehicle skin 114. The protected vehicle skin 114 may provide protection for the protected volume of the main body 112. The protected vehicle skin 114 may provide protection around a portion of the vehicle with less heat transfer during the reentry into the atmosphere. The reentry vehicle 110 may also include a thermal control system 400 with channels (metallic ductwork and/or metallic ducts) embedded in the vehicle skin 114, as described below. The vehicle skin 114 may include a Flexible Insulation Blanket (FIB) or shuttle thermal blanket 116. The FIB 116 and vehicle skin 114 may be a quilted, flexible blanket-like surface insulation that can be used where reentry temperature is below 649° C. (1,250° F.).

Arrows in FIG. 4 represent transfer of heat 12 generated from the bow/nose shocks during the reentry of the vehicle 110 through the atmosphere. The heat 12 may include stagnated vortex flow from wing root flow mixing with the flow downstream of the bow/nose shocks. A primary air flow 16 around the main body 112 and the reentry vehicle 110 during descent for the reentry vehicle 110 may be as shown in FIG. 4. Based on this heat transfer to the reentry vehicle 110, a thermal control system is needed to mitigate aerodynamic friction heating of a vehicle entering the atmosphere from orbit. As described herein, a thermal control system may provide the advantage of coupling both thermal protection and propulsion for the reentry vehicle 110 entering the atmosphere from orbit.

The thermal control systems 400 illustrated in FIGS. 4, 5A, 5B, and 5C may include a surface heat exchanger 410 positioned in proximity to a surface of the main body 112 of the reentry vehicle 110. The surface heat exchanger 410 may include channels embedded in the vehicle skin 114, for example, near flow stagnation points and/or along surfaces that lead the reentry vehicle 110 into the atmosphere. Before reentry, the surface heat exchanger 410 may be filled with a working fluid. The working fluid may freeze if on-orbit timing and vehicle altitude and attitude allows the freezing. Additionally, freezing is not critical to the operation and may be a refinement that can further reduce the amount of mass needed to dissipate the heat generated by conversion from the kinetic and potential energy of the reentry vehicle 110 at reentry insertion. Generally, a frozen working fluid may increase the amount of heat the initial mass of working fluid absorbs before reaching a design heat exchange exit temperature. If frozen, the working fluid may absorb the heat of fusion before heating up to the working fluid's design temperature and pressure.

As the initial working fluid load reaches the design exhaust temperature, the heated working fluid may be moved to the next step in the heating/thrust process. In this step, the working fluid may either be moved or directed to one or more rocket nozzles pointed in a direction to produce thrust opposing vehicle velocity, stored in one or more thermally isolated reservoirs for later propulsive use, or released through nozzles and the surface heat exchanger 410 at the surface of the main body 112 and embedded in the vehicle skin 114 that produce retrograde thrust and inject relatively cool or somewhat cooler mass into the inner most layers of the viscous flow surrounding the reentry vehicle 110. A combination of any or all of these options may be utilized with the thermal control system 400.

Figure 5A:
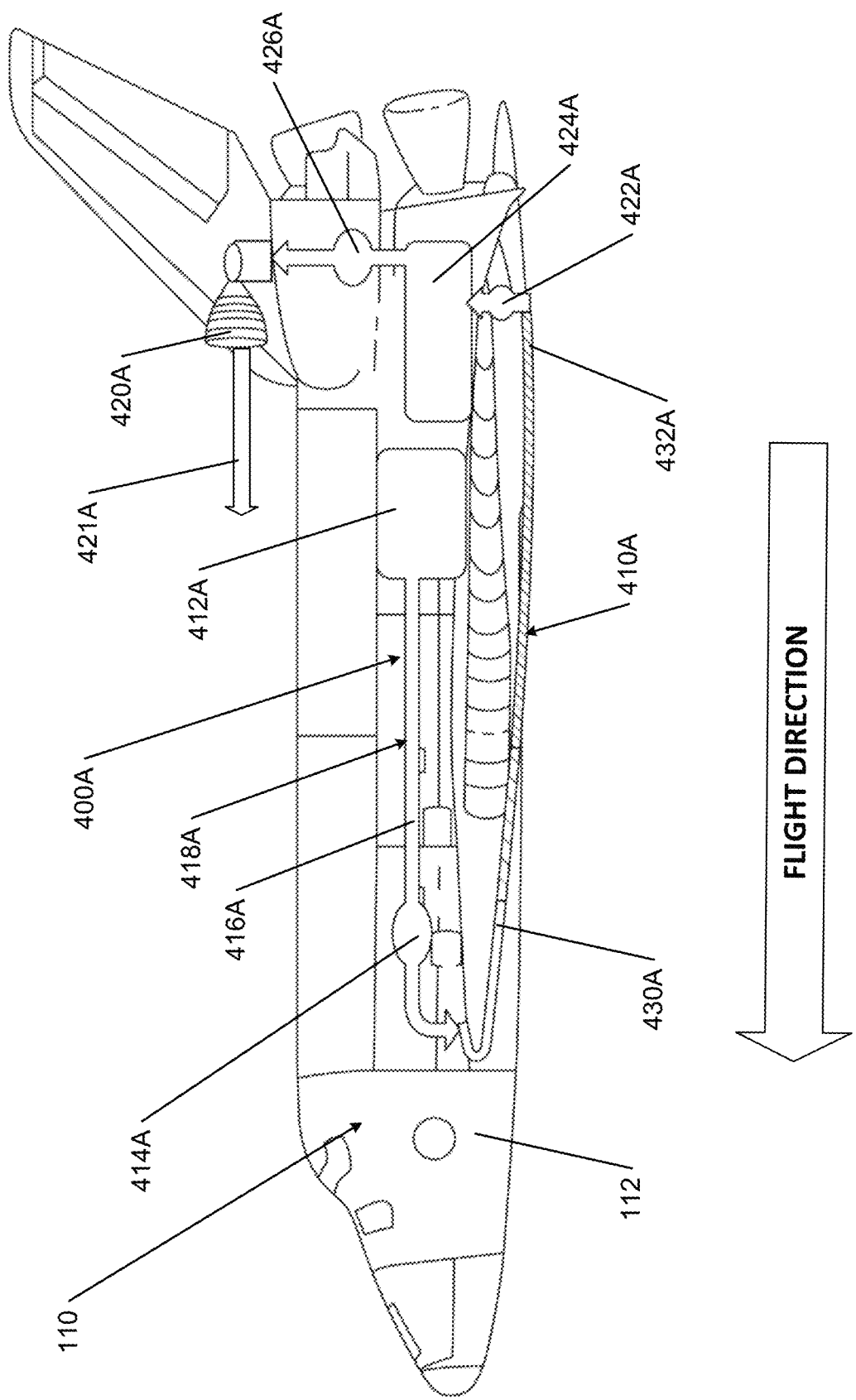
FIG. 5A is a side profile view of the reentry vehicle of FIG. 4 with a coupled thermal control system.

FIG. 5A is a partially schematic side profile view of the reentry vehicle 110 of FIG. 4 with a coupled thermal control system 400A with a leading-edge cooling priority. As illustrated in FIG. 5A, the thermal control system 400A may include a surface heat exchanger 410A, a cool fluid reservoir 412A, a low temperature pump 414A, a working fluid 416A flowing (or flowable through) one or more fluid paths 418A, and one or more nozzles 420A. The surface heat exchanger 410A may comprise one or more fluid channels. The surface heat exchanger 410A may be positioned in proximity to a surface of the main body 112. The surface heat exchanger 410A may be positioned in various positions along the surface of the main body 112, such as: in proximity to a surface of a front portion of the main body 112, in proximity to a surface of a rear portion of the main body 112, in proximity of a leading edge of a wing of the main body 112, and/or in proximity of a trailing edge of the wing of the main body 112. The thermal control system 400A may also include a first high temperature/pressure pump 422A, a heated fluid reservoir 424A, and a second high temperature/pressure pump 426A. The heated fluid reservoir 424A may be an insulated reservoir containing heated coolant from the heat exchanger 410A. The one or more fluid channels from the heat exchanger 410A may transfer heat to the working fluid 416A in the one or more fluid channels. The one or more fluid paths 418A may be configured to transfer heated fluid from the one or more fluid channels in the surface heat exchanger 410A to the one or more output nozzles 420A.

As illustrated in FIG. 5A, the cool fluid reservoir 412A may store and hold the working fluid 416A in an unheated or cool state. The working fluid 416A may be water. Distilled water may be the most likely and environmentally friendly working fluid 416A for the thermal control system 400. The working fluid 416A may be comprised of other fluids, such as any fluid with longer chain hydrocarbons or bio-carbons (sugar water). The working fluid 216 may also comprise gray water (mostly water with some contaminates). The working fluid 416A may freeze if on-orbit timing and vehicle attitude and altitude allows the freezing. The advantage of freezing the working fluid 416A may be most pronounced for fluids residing in the thermally critical areas. The low temperature pump 414A may be connected to the cool fluid reservoir 412A and the surface heat exchanger 410A. The low temperature pump 414A may deliver the working fluid 416A in the unheated state from the cool fluid reservoir 412A through the surface heat exchanger 410A. As illustrated in FIG. 5A, the low temperature pump 414A may deliver the working fluid 416A from the cool fluid reservoir 412A to a leading edge 430A of the surface heat exchanger 410A. As the cold working fluid 416A moves through the surface heat exchanger 410A, the heat transfer cools the surface heat exchanger 410A and heats the working fluid 416A. The surface heat exchanger 410A may transfer incoming heat to the working fluid 416A flowing through surface heat exchanger 410A. The thermal control system 400A may also include a heated fluid reservoir 424A for storing and holding the working fluid 416A in a heated state following the surface heat exchanger 410A. The headed fluid reservoir 424A may be an insulated reservoir. The heated fluid reservoir 424A may be connected to a trailing edge 432A of the surface heat exchanger 410A or connected across a lower surface of the wing. It is possible that at some point around the lower surface of the wing, the local heating rates are low enough that the working fluid 416A will be heating the rest of the structure at which point the working fluid 416A may need to be directed into an insulated pathway leading to the heated fluid reservoir 424A or the nozzles 420A. The first high temperature pump 422A may be connected to the surface heat exchanger 410A and an inlet of the heated fluid reservoir 424A. The first high temperature pump 422A may deliver the working fluid 416A in the heated state from the surface heat exchanger 410A to the heated fluid reservoir 424A. The thermal control system 400A may also include a second high temperature pump 426A connected to an outlet of the heated fluid reservoir 424A. The second high temperature pump 426A may deliver the working fluid 416A in the heated state from the heated fluid reservoir 424A to the one or more nozzles 420A.

The one or more nozzles 420A may be positioned so that the heated fluid output is via the one or more nozzles 420A via a mass flow vector 421A. Although not shown, a thrust vector may be created in a direction opposite to the direction of forward motion represented by the vector 421A. That thrust vector (and/or a net thrust vector from multiple nozzles) may have a component directed in a direction opposing the forward motion of the reentry vehicle 110 and away from the main body 112 to an outermost part of the heat exchanger 410A. The one or more nozzles 420A may be thrusting devices and/or rocket nozzles that convert the working fluid 416A into thrust to reduce velocity of the reentry vehicle 110. The thrust may reduce the amount of velocity dissipated through body friction of the reentry vehicle 110. The net thrust vector may completely reduce the amount of velocity dissipated through body friction of the reentry vehicle 100.

Figure 5B:
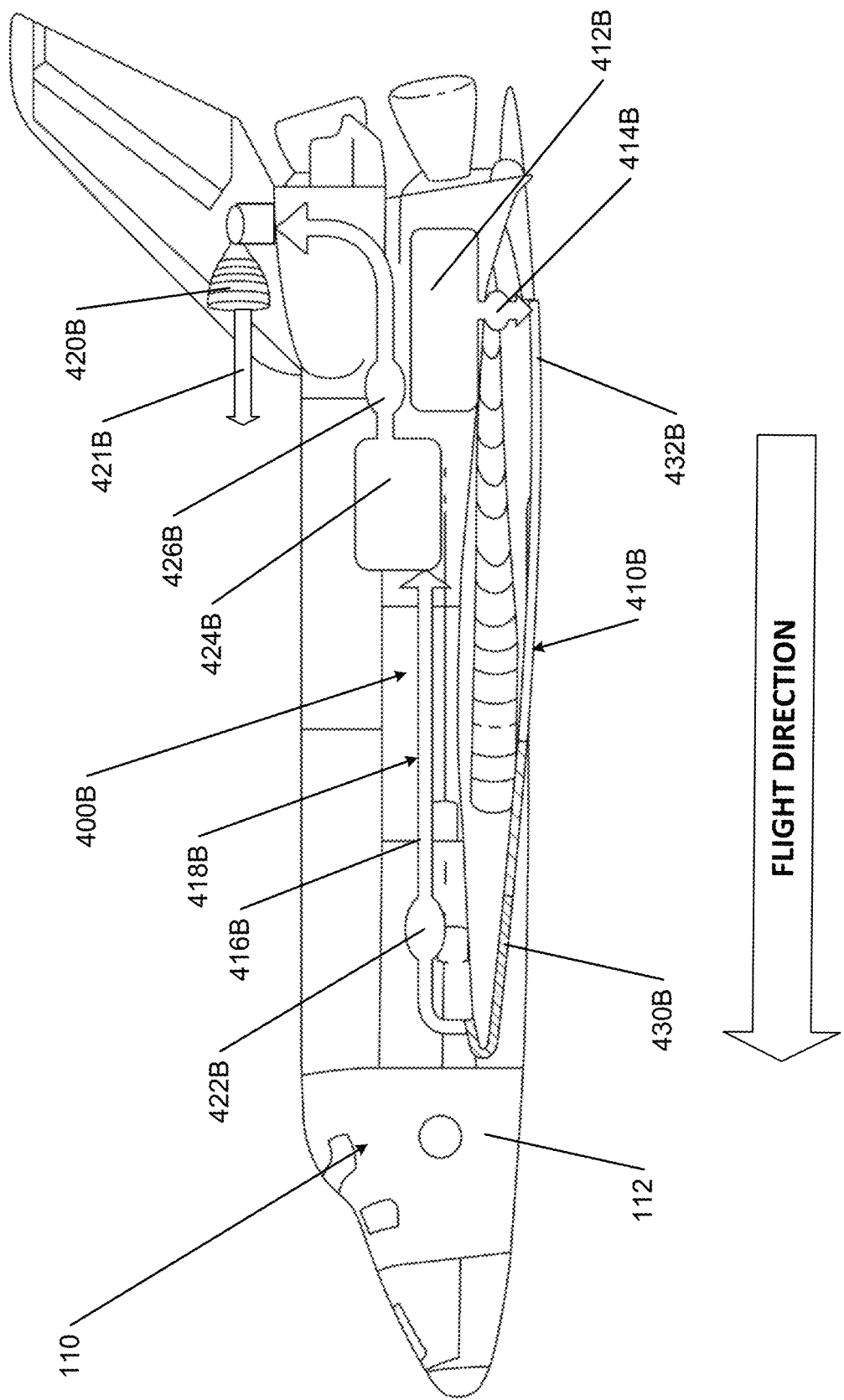
FIG. 5B is a side profile view of the reentry vehicle of FIG. 4 with another coupled thermal control system.

FIG. 5B is a partially schematic side profile view of another embodiment of the reentry vehicle 110 of FIG. 4 with another coupled thermal control system 400B with trailing edge injection. For the embodiment of FIG. 5B, the features of the thermal control system 400B are referred to using similar reference numbers under the "4XXB" series of reference numerals, rather than "4XXA" as used for the thermal control system 400A in the embodiment of FIG. 5A. A "4XXA" feature may be similar to "4XXB" feature (e.g., features that only differ by appended letter may be similar). Accordingly, certain features of the thermal control system 400B that were already described above with respect to the thermal control system 400A of FIG. 5A may be described in lesser detail, or may not be described at all.

As illustrated in FIG. 5B, the thermal control system 400B may include a surface heat exchanger 410B, a cool fluid reservoir 412B, a low temperature pump 414B, a working fluid 416B flowing (or flowable) through one or more fluid paths 418B, and one or more nozzles 420B. The surface heat exchanger 410B may comprise one or more fluid channels. The surface heat exchanger 410B may be positioned in proximity to a surface of the main body 112.

The surface heat exchanger 410B may be positioned in various positions along the surface of the main body 112, such as: in proximity to a surface of a front portion of the main body 112, in proximity to a surface of a rear portion of the main body 112, in proximity of a leading edge of a wing of the main body 112, and/or in proximity a trailing edge of the wing of the main body 112. The thermal control system 400B may also include a first high temperature/pressure pump 422B, a heated fluid reservoir 424B, and a second high temperature/pressure pump 426B. The one or more fluid channels from the heat exchanger 410B may transfer heat to the working fluid 416B in the one or more fluid channels. The one or more fluid paths 418B may be configured to transfer heated fluid from the one or more fluid channels in the surface heat exchanger 410B to the one or more output nozzles 420B.

As illustrated in FIG. 5B, the cool fluid reservoir 412B may store and hold the working fluid 416B in an unheated or cool state. The working fluid 416B may freeze if on-orbit timing and vehicle attitude and altitude allows the freezing. The low temperature pump 414B may be connected to the cool fluid reservoir 412B and the surface heat exchanger 410B. The low temperature pump 414B may deliver the working fluid 416B in the unheated state from the cool fluid reservoir 412B through the surface heat exchanger 410B. As illustrated in FIG. 5B, the low temperature pump 414B may deliver the working fluid 416B from the cool fluid reservoir 412B to a trailing edge 432B of the surface heat exchanger 410B. As the cold working fluid 416B moves through the surface heat exchanger 410B, the heat transfer cools the surface heat exchanger 410B and heats the working fluid 416B. The surface heat exchanger 410B may transfer incoming heat to the working fluid 416B flowing through surface heat exchanger 410B. The thermal control system 400B may also include a heated fluid reservoir 424B for storing and holding the working fluid 416B in a heated state following exposure to heating in the surface heat exchanger 410A. The heated fluid reservoir 424B may be connected to a leading edge 430B of the surface heat exchanger 410B. The first high temperature pump 422B may be connected to the surface heat exchanger 410B and an inlet of the heated fluid reservoir 424B. The first high temperature pump 422B may deliver the working fluid 416B in the heated state from the surface heat exchanger 410B to the heated fluid reservoir 424B. The thermal control system 400B may also include a second high temperature pump 426B connected to an outlet of the heated fluid reservoir 424B. The second high temperature pump 426B may deliver the working fluid 416B in the heated state from the heated fluid reservoir 424B to the one or more nozzles 420B.

The one or more nozzles 420B may be positioned so that the heated fluid output via the one or more nozzles 420B creates a net thrust vector corresponding to one or more mass flow vectors 421B. The net thrust vector may have a component directed in a direction opposing the forward motion of the reentry vehicle 110 and away from the main body 112 to an outermost part of the heat exchanger 410B. The one or more nozzles 420B may be thrusting devices and/or rocket nozzles that convert the working fluid 416B into thrust to reduce velocity of the reentry vehicle 110. The thrust may reduce the amount of velocity dissipated through body friction of the reentry vehicle 110. The net thrust vector is intended to reduce the amount of velocity dissipated through body friction of the reentry vehicle 110.

Figure 5C:
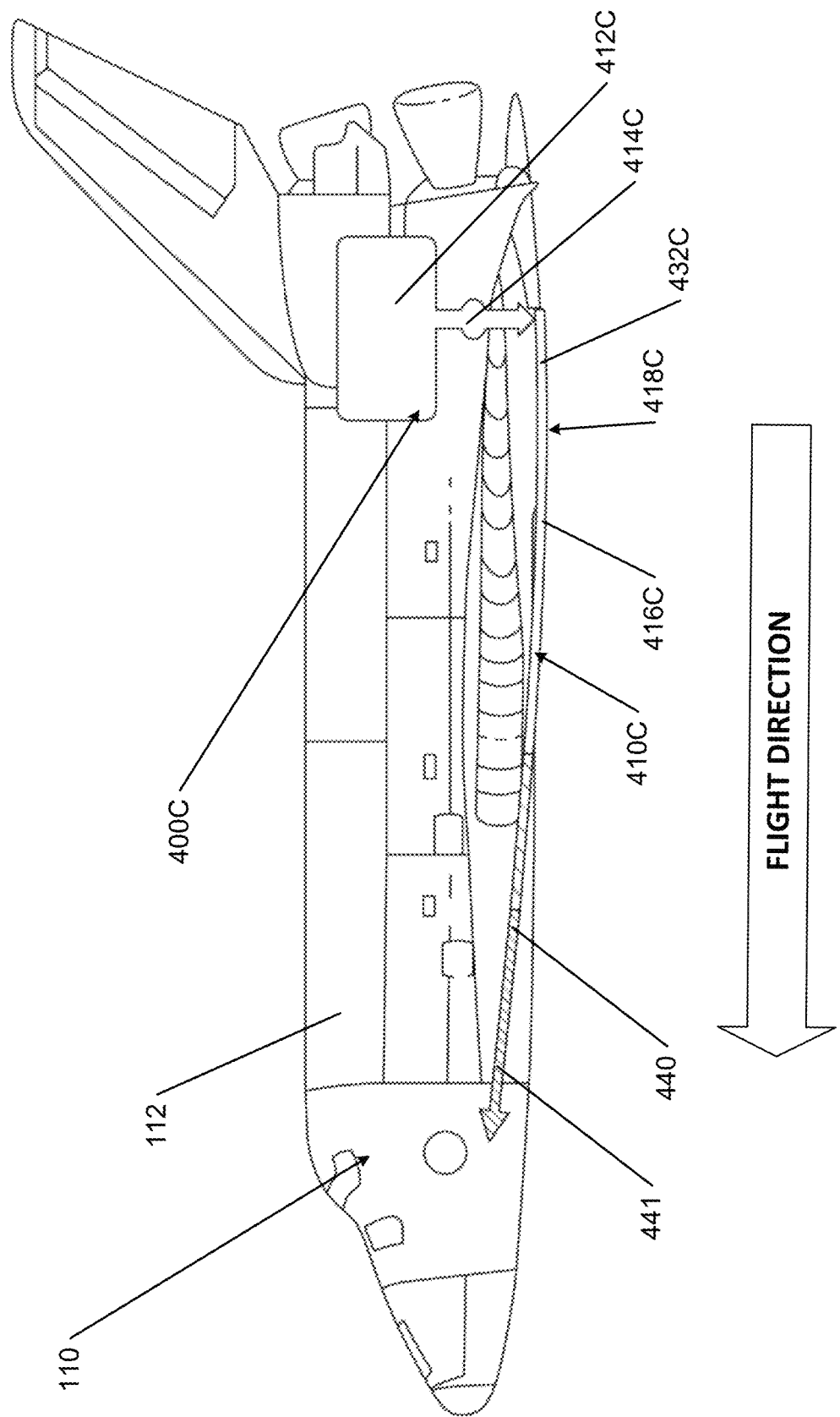
FIG. 5C is a side profile view of the reentry vehicle of FIG. 4 with another coupled thermal control system.

FIG. 5C is a side profile view of another embodiment of the reentry vehicle 110 of FIG. 4 with another coupled thermal control system 4000 with a surface heat exchanger with a nozzle integrated system with edge injection. For the embodiment of FIG. 5C, the features of the thermal control system 4000 are referred to using similar reference numbers under the "4XXC" series of reference numerals, rather than "4XXA" as used for the thermal control system 400A in the embodiment of FIG. 5A. A "4XXA" feature may be similar to a "4XXC" feature (e.g., features that only differ by appended letter may be similar). Accordingly, certain features of the thermal control system 4000 that were already described above with respect to the thermal control system 400A of FIG. 5A may be described in lesser detail, or may not be described at all.

As illustrated in FIG. 5C, the thermal control system 4000 may include a surface heat exchanger 410C, a cool fluid reservoir 412C, a low temperature pump 414C, and a working fluid 416C travelling through one or more fluid paths 418C. The surface heat exchanger 410C may comprise one or more fluid channels. The surface heat exchanger 410C may be positioned in proximity to a surface of the main body 112. The surface heat exchanger 410C may be positioned in various positions along the surface of the main body 112, such as: in proximity to a surface of a front portion of the main body 112, in proximity to a surface of a rear portion of the main body 112, in proximity of a leading edge of a wing of the main body 112, and/or in proximity a trailing edge of the wing of the main body 112.

As illustrated in FIG. 5C, the cool fluid reservoir 412C may store and hold the working fluid 416C in an unheated or cool state. The working fluid 416C may freeze if on-orbit timing and vehicle attitude and altitude allows the freezing. If timing and the vehicle attitude/altitude supports freezing, the working fluid 416C may be pumped through the heat exchanger 410C and the reentry vehicle 110 may be oriented to shade the heat exchanger 410C enough to allow the working fluid 416C to freeze. The low temperature pump 414C may be connected to the cool fluid reservoir 412C and the surface heat exchanger 410C. The low temperature pump 414C may deliver the working fluid 416C in the unheated state from the cool fluid reservoir 412C through the surface heat exchanger 410C. As illustrated in FIG. 5C, the low temperature pump 414C may deliver the working fluid 416C from the cool fluid reservoir 412C to a trailing edge 432C of the surface heat exchanger 410C. As the cold working fluid 416C moves through the surface heat exchanger 410C, the heat transfer cools the surface heat exchanger 410C and heats the working fluid 416C. The surface heat exchanger 410C may transfer incoming heat to the working fluid 416C flowing through surface heat exchanger 410C. The low temperature pump 414C may push the working fluid 416C in the heated state through the surface heat exchanger 410C and through a plurality of leading-edge nozzles 440 to create counter thrust in a net thrust vector associated with one or more mass flow vectors 441, as will be explained in more detail below with FIGS. 7A, 7B, and 7C. The plurality of leading-edge nozzles 440 may be positioned so that the heated fluid output via the plurality of leading-edge nozzles 440 creates the vector(s) 441. A corresponding net thrust vector may have a component directed in a direction opposing the forward motion of the reentry vehicle 110 and away from the main body 112 to the rear of the reentry vehicle 110. The net thrust vector may reduce the amount of velocity dissipated through body friction of the reentry vehicle 110. The net thrust vector may completely reduce the amount of velocity dissipated through body friction of the reentry vehicle 110.

Figure 6:
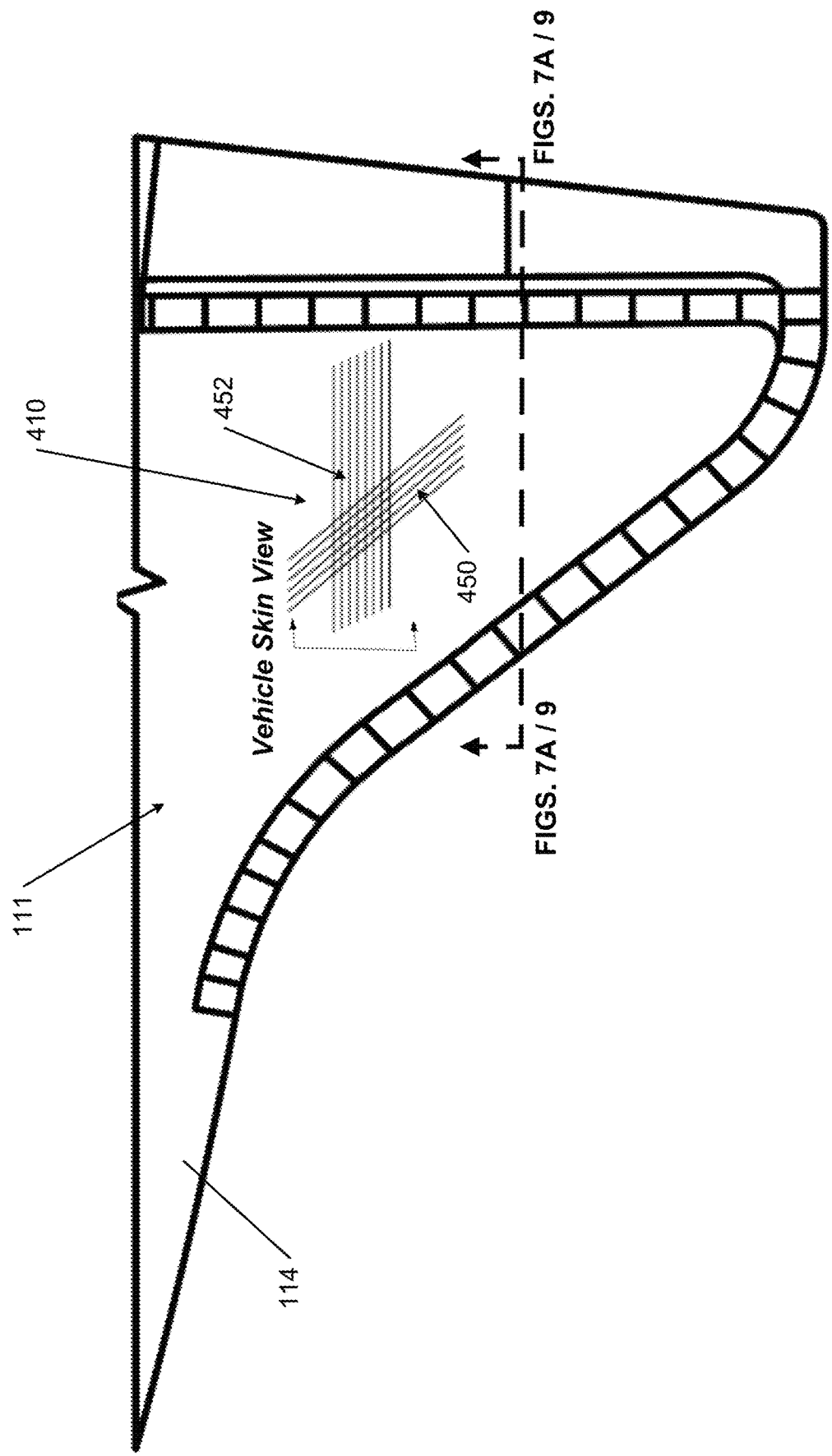
FIG. 6 is a planform bottom up view of the wing of the reentry vehicle of FIG. 5C showing an example surface heat exchanger.

FIG. 6 illustrates a planform bottom up view of a wing 111 on the vehicle 110 showing the surface heat exchanger 410 (e.g., any of the heat exchangers 410A, 410B, or 410C) of the thermal control system 400 (e.g., any of the thermal control systems 400A, 400B, or 4000). As illustrated in FIG. 6, the surface heat exchanger 410 may include both lateral heat exchange tubes 450 and longitudinal heat exchange tubes 452 along the vehicle skin. The lateral heat exchange tubes 450 may cross with the longitudinal heat exchange tubes 452 (e.g., may form intersecting and/or overlaid sets of parallel heat exchange tubes). The lateral heat exchange tubes 450 may run along the wing span while longitudinal heat exchange tubes 452 run along the wing chord (or cross-section).

The alignment of the surface heat exchanger 410 and specifically the lateral heat exchange tubes/channels 450 and the longitudinal heat exchange tubes/channels 452 may provide redundant heat transfer capacity in case of a breach in any of the thermally critical sections of the vehicle skin 114. The alignment of the surface heat exchanger 410 may include smaller channels 450, 452 arranged in a cross-hatch pattern. The channels 450, 452 arranged in a cross-hatch pattern may provide a level of redundancy to the surface heat exchanger 410. The lateral heat exchange tubes/channels 450 and the longitudinal heat exchange tubes/channels 452 may include a main layer of cooling channels expected to be fabricated from a sufficiently strong material (high temperature steel or composite ceramics), thereby potentially limiting the chance of damage. These overlaid channels may make the complete system redundant—or effectively redundant. A puncture wound in one or more of the lateral heat exchange tubes/channels 450 and/or the longitudinal heat exchange tubes/channels 452 might take out a small circular area at the crossing of these sets of channels but the surrounding channels may still absorb heat. In the case of a breach or failure, the remaining tubing in both layers, e.g., the lateral heat exchange tubes 450 and the longitudinal heat exchange tubes 452, may be subjected to increased heat flows but may be sized and arranged to handle the extra load.

Additionally, the thermal control system 400 may utilize one or more valves to adjust pumping rates and fluid routing from the various pumps in the thermal control system 400 to compensate for any damaged channels in the heat exchanger 410. This feature provides added safety in case the channels are damaged. The amount impulse or force that the lower surface of the reentry vehicle 100, 110 employing the heat exchange tubes/channels may sustain without damage matches or may be significantly higher than the force most aircraft can withstand. Heat protection such as the Space Shuttle tiles and Moon Race reentry vehicle heat shields were comparatively structurally fragile.

Figure 7A:
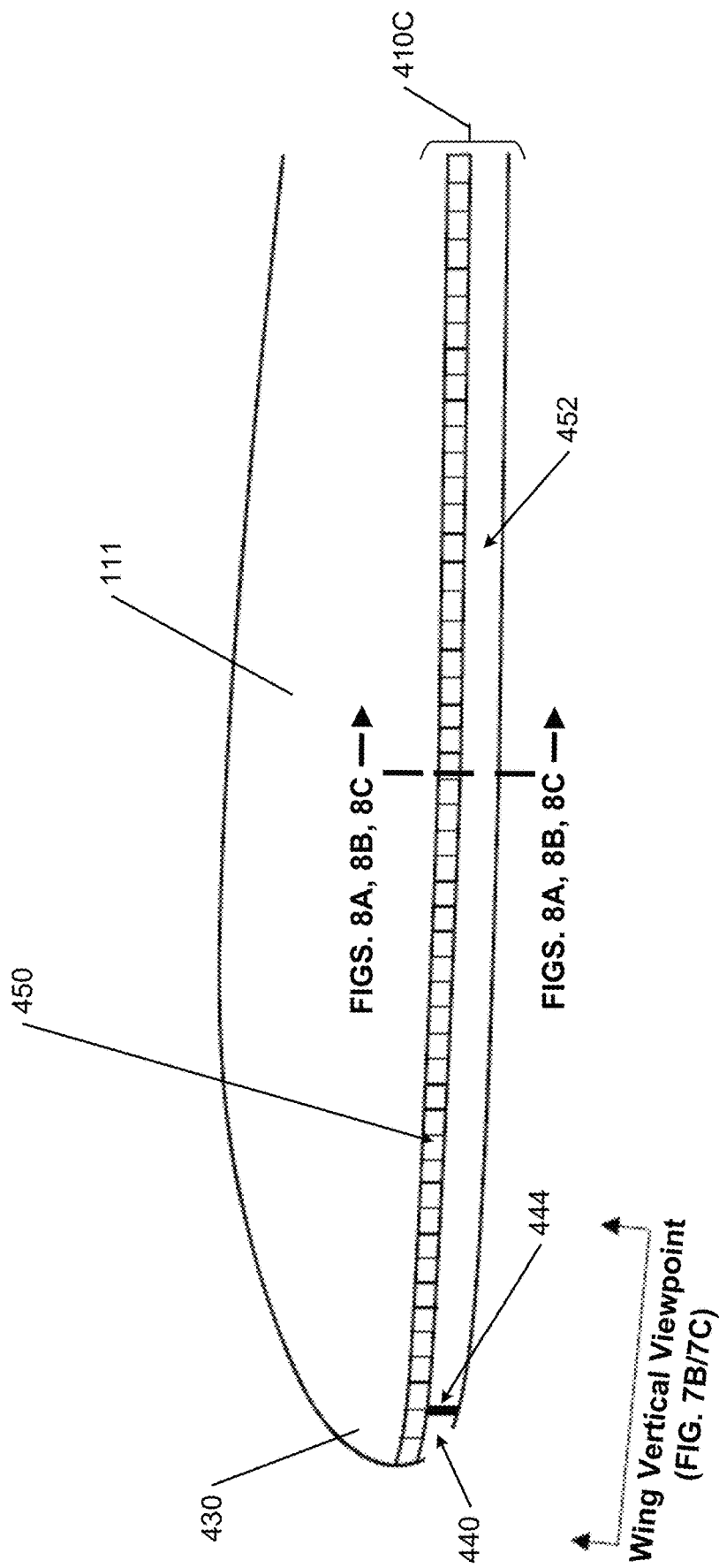
FIG. 7A is a cross-sectional structural view showing an example wing of a reentry vehicle with integrated leading-edge nozzles.
Figure 7B:
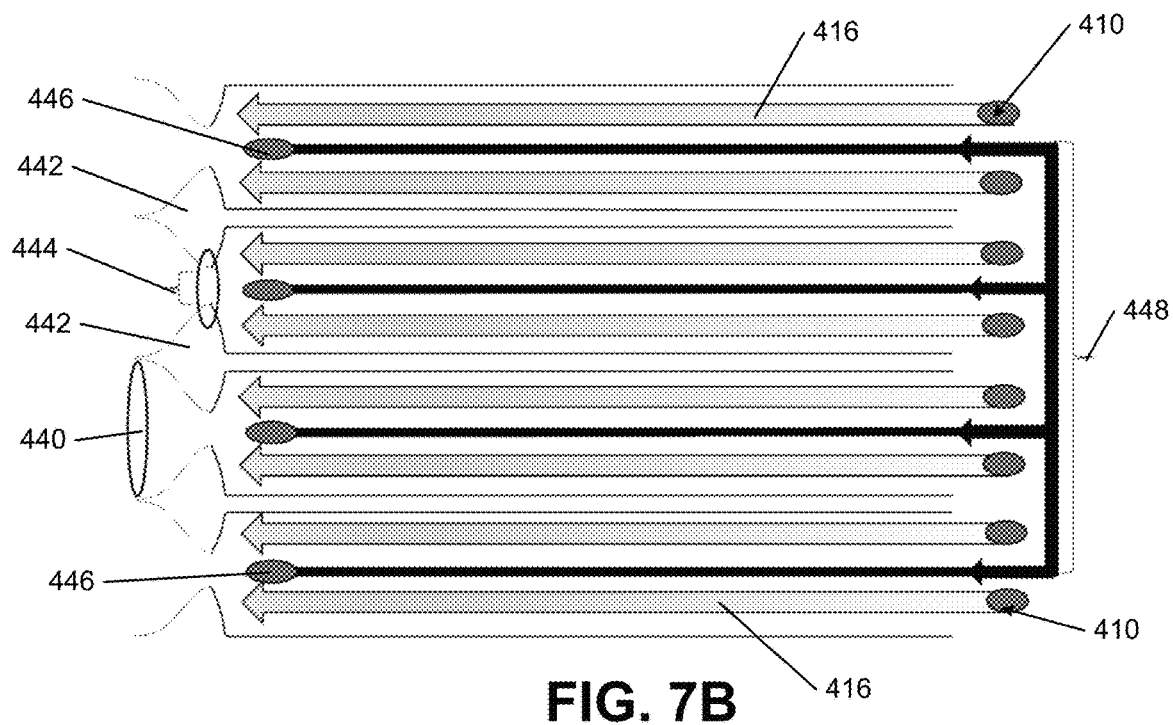
FIG. 7B is a vertical viewpoint from perspective shown in FIG. 7A of the wing of the reentry vehicle with integrated leading-edge nozzles and a throat ratio insert in a retracted position.
Figure 7C:
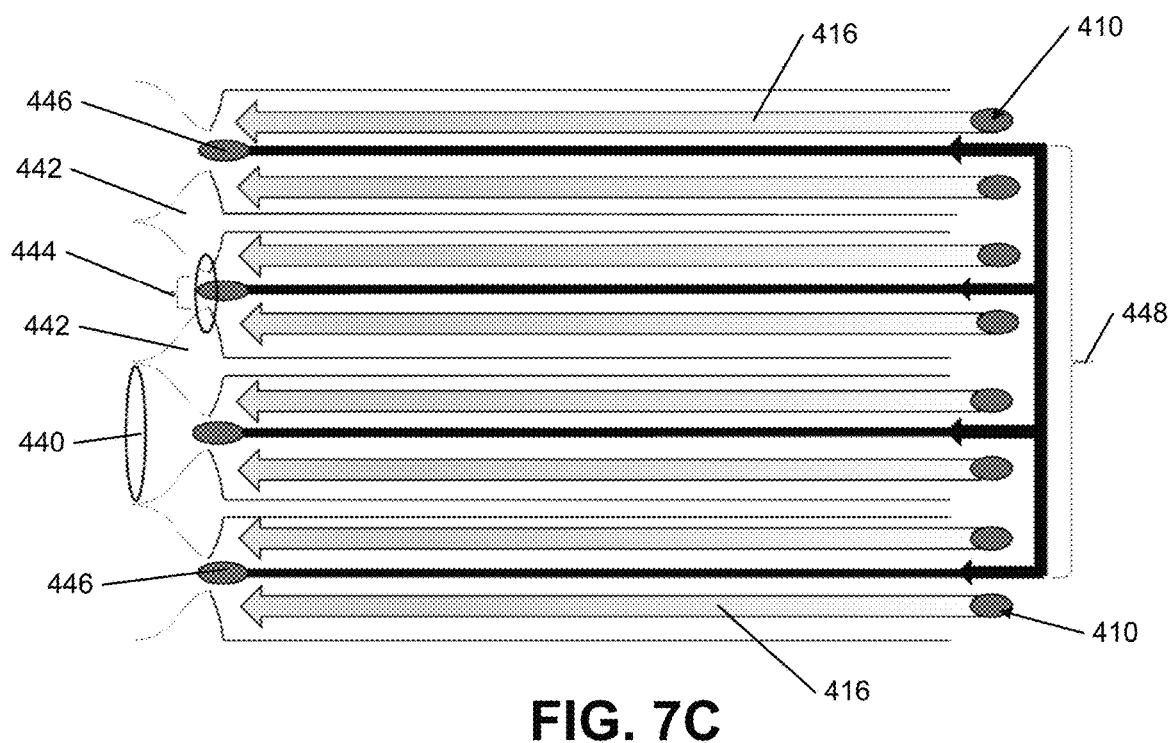
FIG. 7C is a vertical viewpoint from perspective shown in FIG. 7A of the wing of the reentry vehicle with integrated leading-edge nozzles and a throat ratio insert in an extended position.

FIGS. 7A, 7B, and 7C illustrate an embodiment of the surface heat exchanger 410C that may be utilized with the thermal control system 4000. The surface heat exchanger 410C may include a plurality of leading-edge nozzles 440 integrated into the plurality of longitudinal heat exchange tubes 452 located at the leading edge 430 and connected to the cool fluid reservoir or other lateral channels. The plurality of leading-edge nozzles 440 are intended to provide retroactive thrust, associated with mass flow vectors of expelled heated fluid, counter to the flight path of the reentry vehicle 110 to slow the reentry vehicle 110 during the reentry into the atmosphere.

FIG. 7A shows a cross-sectional structural view of a wing 111 of the reentry vehicle 110 with integrated leading-edge nozzles 440 located at the leading edge 430 of the wing 111. The sectional plane for FIG. 7A is along the wing cross section as shown in FIG. 6. FIGS. 7B and 7C show vertical viewpoints from the perspective shown in FIG. 7A of the wing 111 of the reentry vehicle 110. FIG. 7B specifically illustrates the outer layer heat exchange tubes with integrated leading-edge nozzles 440 and the throat ratio insert 446 in a retracted position. FIG. 7C specifically illustrates the outer layer heat exchange tubes with integrated leading-edge nozzles 440 and the throat ratio insert 446 in an extended position. The plurality of leading-edge nozzles 440 may include a plurality of nozzle profiles 442, each with a shape and size as illustrated in FIGS. 7B and 7C. Other nozzle profiles 442 may be utilized. The plurality of leading-edge nozzles 440 may also include a plurality of nozzle throats 444 located in between two of the nozzle profiles 442. A throat ratio insert 446 may be located within each of the plurality of nozzle throats 444. The plurality of leading-edge nozzles 440 may also include a throat ratio insert actuator 448. The throat ratio insert actuator 448 may be a nozzle throat to exit ratio control actuator that controls the extending and retracting of the throat ratio insert 446 within the nozzle throats 444. The throat ratio insert actuator 448 may control the expansion ratio of the nozzle throats through the nozzle profiles being injected through the channels of the heat exchanger 410 and the plurality of leading-edge nozzles 440.

The throat ratio inserts 446 and throat ratio insert actuators 448 may allow the active thermal control system 400 to adjust the velocity with which the heated working fluid 416C exits the cooling channels of the heat exchanger 410C. At maximum heating rates the throat ratio inserts 446 would likely be fully inserted as shown in FIG. 7C. With the throat ratio insert 446 pushed into the throat 444 of these nozzles 440, the throat area 444 may be reduced significantly which raises the ratio of throat area to nozzle exit area. This ratio may increase because the throat area is reduced by the tip portion of the throat ratio insert 446, which now protrudes into the throat 444. This increased ratio when backed by a sufficiently heated working fluid 416 may significantly raise the velocity of the working fluid 416C at the nozzle exit 440. The velocity of an energetic flow through a nozzle 440 will be largely governed by the throat to exit ratio. The throat ratio inserts 446 and throat ratio insert actuators 448 allow adjusting this ratio to the maximum supported by the temperature of the working fluid (coolant) 416C entering the nozzle 440.

The increased velocity possible because of the increase throat to exit ratio may raise the thrust produced by each channel of the heat exchanger 410C for a unit amount of mass. This increased thrust per channel of the heat exchanger 410C in turn may raise the overall thrust opposing forward motion further reducing the energy of the reentry vehicle 110 as it reenters the atmosphere. The end portion of the throat ratio insert 446 may be sized and shaped to keep the curve of the expanding nozzles 440 smooth enough to maintain efficient flows. With the throat ratio insert 446 in the retracted position as shown in FIG. 7B, the throat to nozzle exit ratio may be based on the machined profile 442 of the nozzle 440 because the retracted throat ratio insert 446 does not reduce the throat area 444.

Figure 8A:
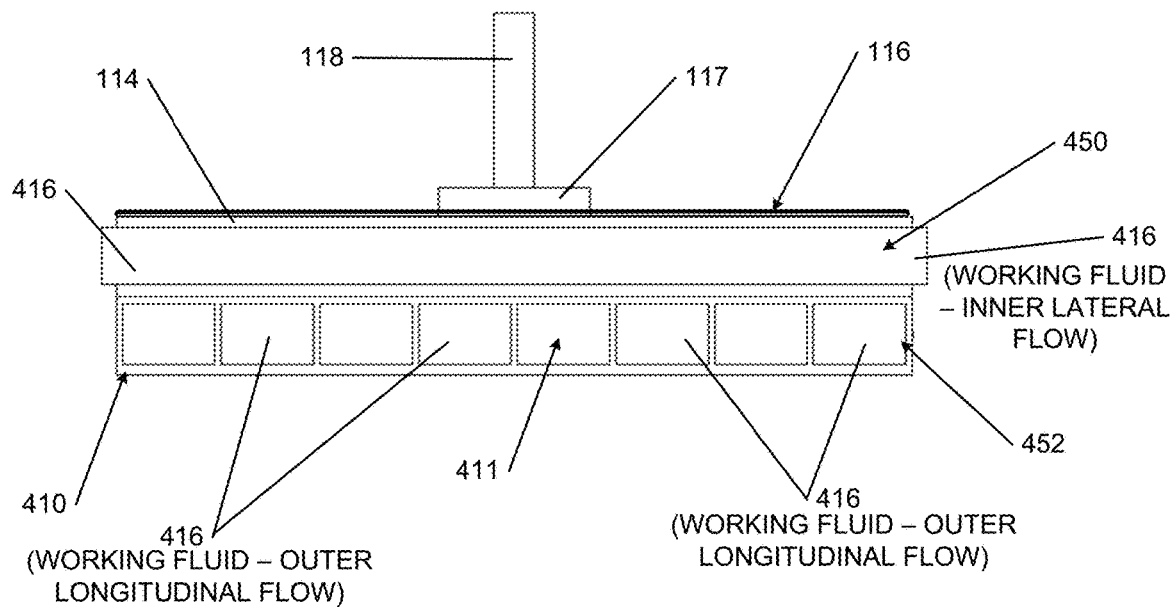
FIGS. 8A-8C are cross-sectional views showing example heat exchange tubes of a reentry vehicle.
Figure 8B:
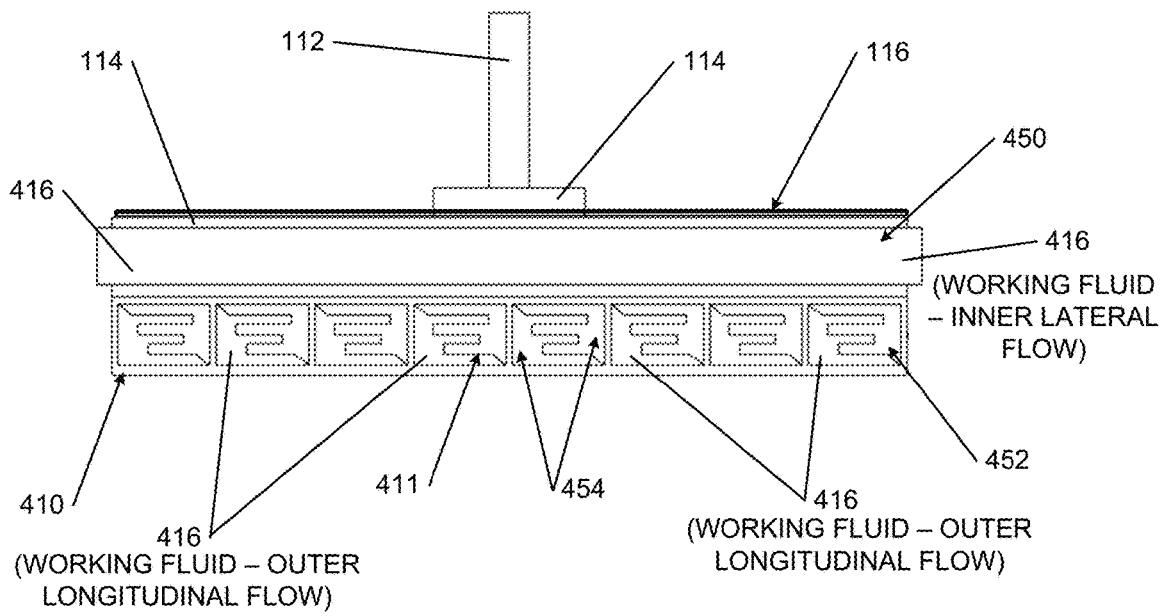
Figure 8C:
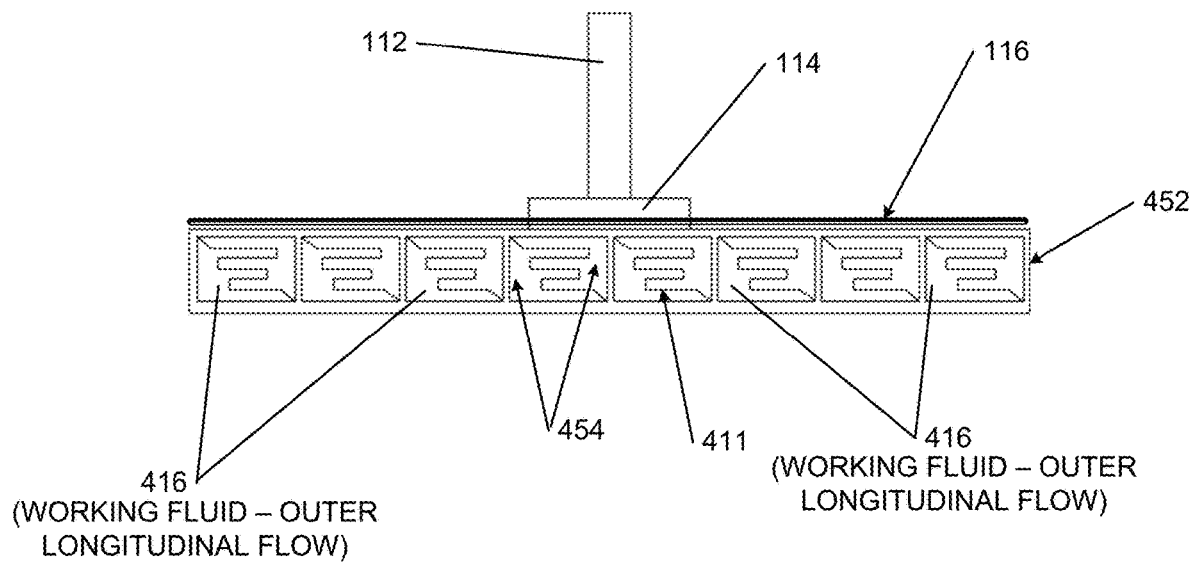

FIGS. 8A-8D illustrate examples of the surface heat exchanger 410 (e.g., any of the surface heat exchangers 410A, 410B, or 410C) that may be used with the thermal control system 400 (e.g., any of the thermal control systems 400A, 400B, or 4000). FIGS. 8A, 8B, and 8C illustrate cross-sectional views looking along the path of the surface of the wing 111 shown in FIG. 7A. The wing 111 may include a flange or end cap 117 of a wing spar 118 along the main body of the reentry vehicle. Additionally, the vehicle skin 114 may include a layer of Flexible Insulation Blanket (FIB) 116 in selected areas along the vehicle skin 114.

Specifically, FIG. 8A illustrates the surface heat exchanger 410 with a simple outer exchanging tube 452. As illustrated in FIG. 8A, the surface heat exchanger 410 may include inner lateral heat exchange tubes 450 located along the vehicle skin 114. An inner working fluid 416 (e.g., any of the working fluid 416A, 416B, or 416C) may flow through the inner lateral heat exchange tubes 450 and then through the longitudinal heat exchange tubes 452. Additionally, the surface heat exchanger 410 may include outer longitudinal heat exchange tubes 452 located on an outer surface of the surface heat exchanger 410. The working fluid 416 may flow through the outer longitudinal heat exchange tubes 452.

FIG. 8B illustrates the surface heat exchanger 410 with an interlocking outer channel heat exchanging tube 452. As illustrated in FIG. 8B, the surface heat exchanger 410 may include inner lateral heat exchange tubes 450 located along the vehicle skin 114. An inner working fluid 416 may flow through the inner lateral heat exchange tubes 450 and then through the longitudinal heat exchange tubes 452. Additionally, the surface heat exchanger 410 may include outer longitudinal heat exchange tubes 452 located on an outer surface of the surface heat exchanger 410. An outer working fluid 416 may flow through the outer longitudinal heat exchange tubes 452. The outer longitudinal heat exchange tubes 452 may include interlocking channels 454 as described below and detailed in FIG. 8D.

FIG. 8C illustrates the surface heat exchanger 410 with only an interlocking outer channel heat exchanging tube 452. As illustrated in FIG. 8C, the surface heat exchanger 410 may only include outer longitudinal heat exchange tubes 452 located along the vehicle skin 114 and on an outer surface of the surface heat exchanger 410. An outer working fluid 416 may flow through the outer longitudinal heat exchange tubes 452. The outer longitudinal heat exchange tubes 452 may include interlocking channels 454 as described below and detailed in FIG. 8D.

Figure 8D:
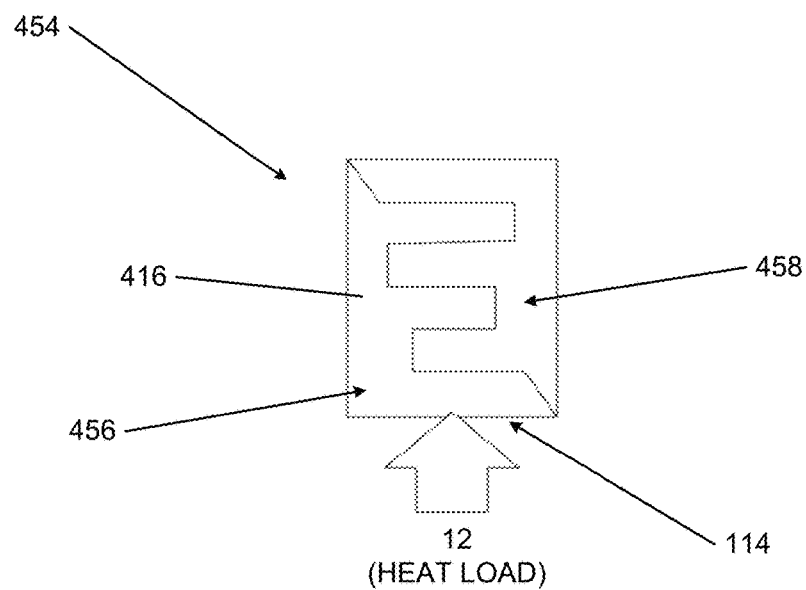
FIG. 8D is a cross-sectional view showing an example heat exchange tube with interlocking dissipation channels.

FIG. 8D illustrates an exemplary cross-sectional view of a heat exchanger 410 with interlocking dissipation channels 454. FIG. 8D is an expansion of the interlocking, overlaid channels 454 from the outer longitudinal heat exchange tubes 452 shown in FIGS. 8B and 8C. The interlocking dissipating channels 454 may include a primary channel 456 and a secondary channel 458. The primary channel 456 may carry the working fluid 416 flowing through the outer longitudinal heat exchange tubes 452. The primary channel 456 may also carry the heat load 12 at the vehicle skin 114. The secondary channel 458 may dissipate the incoming heat later in its passage through the transfer layer and it may provide the same transfer function as the primary channel 456 does. The interlocking dissipating channels 454 may provide double redundancy for the most basic parts of the system.

Figure 9:
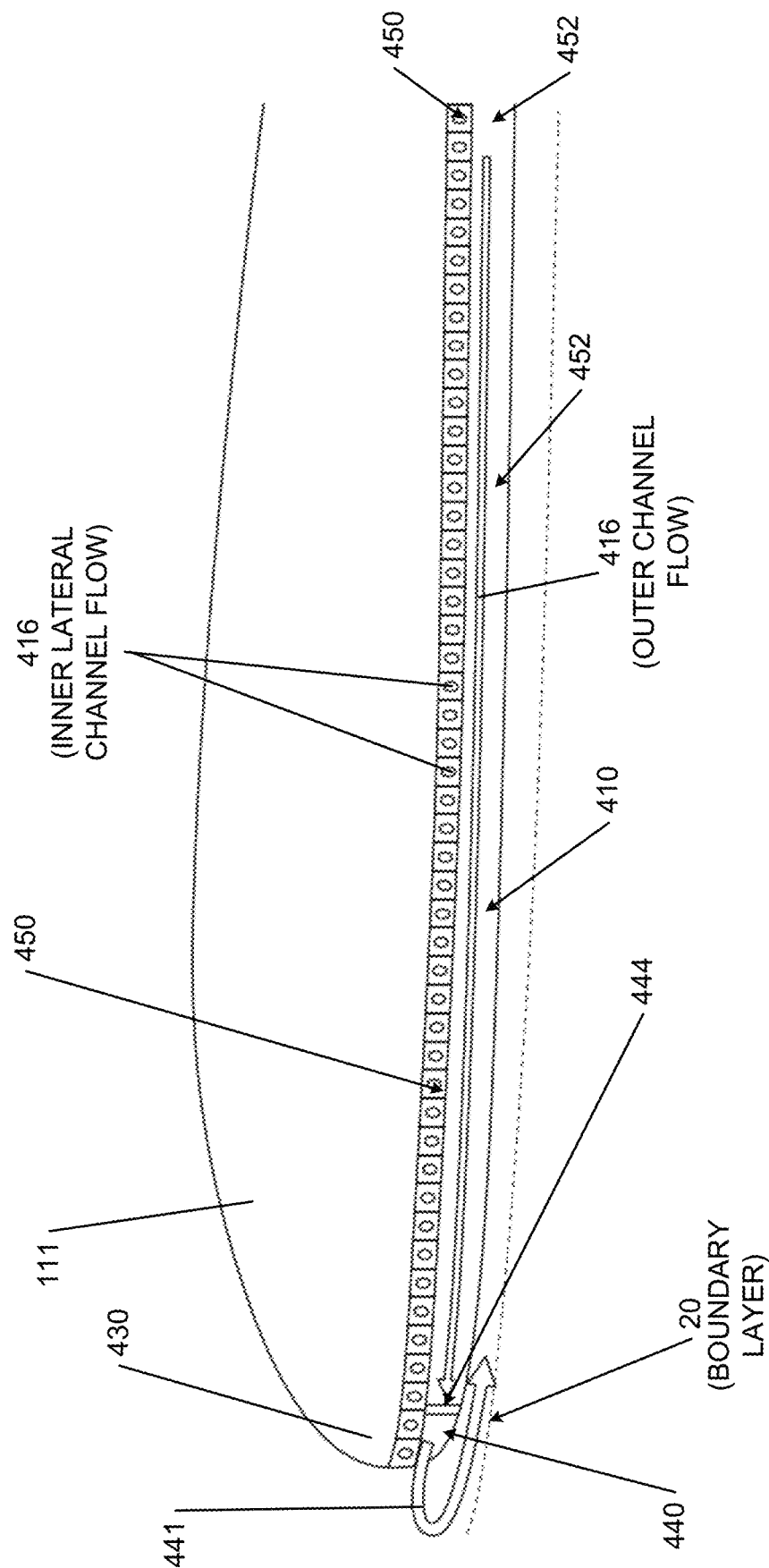
FIG. 9 is a cross-sectional structural view showing a wing of an example reentry vehicle.

FIG. 9 illustrates cross-sectional structural views of a wing 111 of a reentry vehicle 110 along the sectional plane of the wing cross section as shown in FIG. 6. FIG. 9 shows the path of the working fluid 416 (e.g., any of the working fluid 416A, 416B, or 416C) when traveling through a multiple layer heat exchanger 410. The flow in the inner layer of channels 450 is toward the leading edge 430 (or wingtip) of the wing 111 and the outer layer is from the back to the front of the wing 111 along the cross section. FIG. 9 illustrates the wing 111 and the surface heat exchanger 410 with integrated leading-edge nozzles 440 located at the leading edge 430 of the wing 111. The surface heat exchanger 410 may include an inner lateral channel 450 and an outer longitudinal channel 452. At a leading edge 430 of the wing 111, the surface heat exchanger 410 may include the integrated leading-edge nozzles 440 and a nozzle throat 444. FIGS. 7B and 7C provide more details about the integrated leading-edge nozzles 440. FIG. 9 illustrates the inner lateral channel 450 flow of the working fluid 416 and the outer channel 452 flow of the working fluid 416. The working fluid 416 may exit the integrated leading-edge nozzles 440 in a nozzle exit flow 441 that curves around the leading edge 430 and stays close to the vehicle skin 114 because of a boundary layer 20 between the wing 111 and the atmosphere.

Additionally, the thermal control system 400 and the reentry vehicle 110 may add to the structural integrity of the reentry vehicle 110 that comprises the thermal control system 400 and the metal ductwork and channels of the surface heat exchanger 410. Unlike other reentry vehicles where the thermal protection system was fragile and potentially subject to profound damage from something as benign as a piece of foam insulation, the ductwork and channels on the surface heat exchanger 410 on the reentry vehicle 110 may be metal. The ductwork and channels on the surface heat exchanger 410 may be likely to withstand collision with most airborne objects during flight. The most thermally active parts of a vehicle using the thermal control system 400 and the metal ductwork on the surface heat exchanger 410 may thereby have at least two layers of metal (for example, Inconel X) ductwork to transfer the working fluid to the thermally isolated reservoir or directly to one or more of the leading-edge nozzles.

Additionally, if a vehicle comprising a thermal control system such as the thermal control system 200 or 400 is travelling to an orbiting environment like the International Space Station, the launched vehicle could carry clean, potable, and possibly distilled water to the orbiting environment and withdraw a corresponding amount of waste water before reentry. Waste water or distilled waste water may be the most likely and environmentally friendly working fluid for the thermal control system 200, 400. These water transfers may help create a relatively steady supply of fresh water for the orbiting environments. This may make another aspect of human spaceflight more acceptable.

Figure 10:
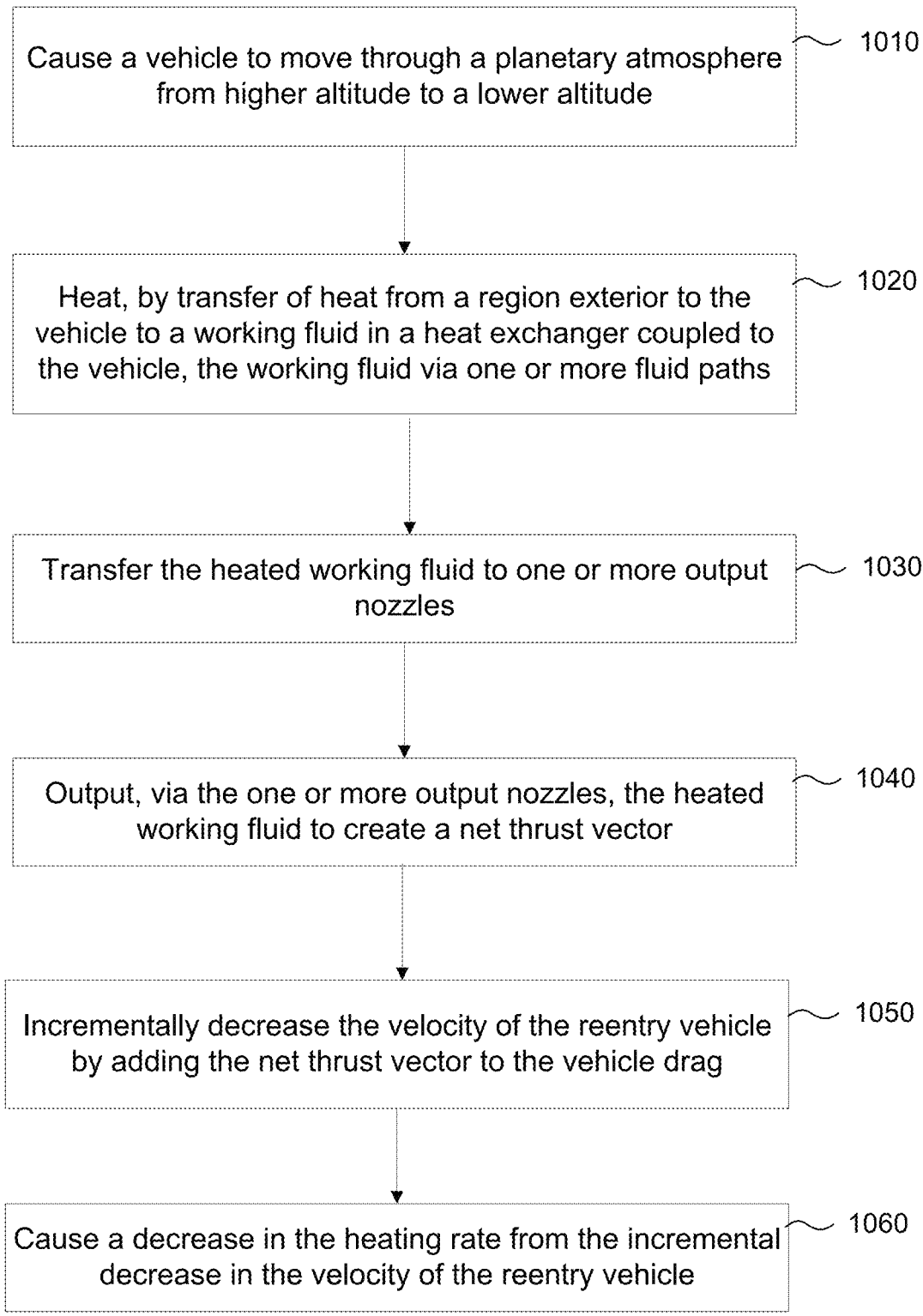
FIG. 10 is a flow chart showing an example method for transferring energy to a thrusting device that can be used to slow a reentry vehicle entering an atmosphere from orbit.

FIG. 10 is a flow chart showing an example method 1000 for transferring energy (directly or after a delay) to a thrusting device that can be used to slow a reentry vehicle entering a gaseous atmosphere from orbit. The steps of the method 1000 may further help mitigate the heating of the vehicle by transferring heat generated by the viscous interaction between the vehicle and high-altitude portions of a planetary atmosphere to a working fluid. The method of FIG. 10 may be performed for a reentry vehicle 100 or 110 using the thermal control system 200 or 400. The steps of the method 1000 may comprise, e.g., what is described in connection with the thermal control system 200, 400 in FIGS. 1-9. Although various operations shown in FIG. 10 are described as performed by the thermal control system 200, 400, one, some, or all such operations (or parts thereof) may be performed by one or more additional components and/or systems. The order of steps shown in FIG. 10 may be varied, and/or one or more steps may be omitted, and/or one or more steps may be added.

In step 1010, a reentry vehicle may begin movement through a planetary atmosphere. As part of step 1010, a control system for the reentry vehicle may cause the reentry vehicle to move through the planetary atmosphere, at a starting velocity of at least 7,500 meters/second, from a higher altitude to a lower altitude. The reentry vehicle may include a main body configured for non-destructive travel through the planetary atmosphere. The main body may comprise one or more internal components.

In step 1020, a thermal control system as part of the reentry vehicle may heat a working fluid by transfer of heat from a region exterior to the vehicle to the working fluid in a heat exchanger coupled to the vehicle. As part of step 1020, the heating may come from the temperature of the high-altitude atmosphere and the drag of that atmosphere as created by interaction with the reentry vehicle. Additionally, as part of step 1020, the heating of the working fluid may be via one or more fluid paths. The one or more fluid paths may comprise one or more tanks configured to store unheated working fluid for delivery to the heat exchanger and a pump between the one or more tanks and the heat exchanger. Further, in step 1020, the reentry vehicle may comprise an extendable plenum coupling the heat exchanger to the main body. In an additional step, the method 1000 may comprise the step of extending the extendable plenum from a retracted configuration in which the heat exchanger is proximate the main body, to an extended configuration in which the heat exchanger is displaced from the main body. Alternatively and/or additionally, in step 1020, the heat exchanger may comprise one or more fluid channels positioned in proximity to a vehicle surface on a forward portion of the main body.

In step 1030, the thermal control system may transfer the heated working fluid to one or more output nozzles. As part of step 1030, the transfer of the heated working fluid may be via the one or more fluid paths that may comprise a tank for heated working fluid and a pump between the tank and the one or more nozzles. The tank may be connected to the heat exchanger.

In step 1040, the thermal control system may output, via the one or more output nozzles, the heated working fluid to create a net thrust vector. As part of step 1040, outputting the heated working fluid may comprise transferring the heated working fluid from the tank to the one or more nozzles. A component of the net thrust vector may be parallel to a direction of the vehicle movement through the planetary atmosphere. The one or more output nozzles may be positioned so that heated fluid output via the one or more output nozzles creates the net thrust vector, and wherein the net thrust vector has a component directed in a direction opposing the forward motion of the reentry vehicle 110 and away from the main body to an outermost part of the heat exchanger. Additionally, the one or more output nozzles may be positioned so that a mass flow vector, of fluid output from the one or more output nozzles, has a component in a direction extending forward from the vehicle surface and away from the main body.

In step 1050, the net thrust vector may then be added to the vehicle drag to incrementally decrease the velocity of the reentry vehicle. The net thrust vector may increase the deceleration of the reentry vehicle. In step 1060, the incremental decrease in the velocity of the reentry vehicle may cause a corresponding decrease in the heating rate. The heating rate may still be enough to convert the working fluid to vapor or a superheated state.

For the avoidance of doubt, the present application includes, but is not limited to, the subject-matter described in the following numbered clauses:

1. A reentry vehicle comprising a main body configured for non-destructive reentry into a planetary atmosphere.
2. The reentry vehicle of clause 1, further comprising a heat exchanger comprising one or more fluid channels and positioned to transfer heat, from an exterior of the main body during the non-destructive reentry, to a working fluid in the one or more fluid channels.

3. The reentry vehicle of clause 1 or clause 2, further comprising one or more output nozzles.

4. The reentry vehicle of any of clauses 1-3, further comprising one or more fluid paths configured to transfer heated fluid from the one or more fluid channels to the one or more output nozzles.

5. The reentry vehicle of any of clauses 1-4, wherein the main body is configured for non-destructive travel through Earth atmosphere, from higher to lower altitude, at a starting velocity of at least 7,500 meters/second.

6. The reentry vehicle of any of clauses 1-5, wherein the main body comprises one or more internal compartments.

7. The reentry vehicle of any of clauses 1-6, wherein the one or more fluid paths comprise a tank for heated working fluid, the tank connected to an output of the heat exchanger.

8. The reentry vehicle of clause 7, wherein the one or more fluid paths comprise a pump between the tank and the one or more nozzles.

9. The reentry vehicle of any of clauses 1-8, further comprising one or more tanks configured to store unheated working fluid for delivery to the heat exchanger.

10. The reentry vehicle of clause 9, further comprising a pump between the one or more tanks configured to store the unheated working fluid and the heat exchanger.

11. The reentry vehicle of any of clauses 1-10, further comprising: an extendable plenum coupling the heat exchanger to the main body, wherein the extendable plenum comprises a retracted configuration in which the heat exchanger is proximate the main body and an extended configuration in which the heat exchanger is displaced from the main body.

12. The reentry vehicle of any of clauses 1-11, wherein the one or more output nozzles are positioned so that heated fluid output via the one or more output nozzles creates a net thrust vector, and wherein the net thrust vector has a component directed in a direction opposing a forward motion of the reentry vehicle and/or away from the main body and/or toward an outermost part of the heat exchanger.

13. The reentry vehicle of any of clauses 1-12, wherein the heat exchanger comprises interlocking fluid channels with a primary channel and a secondary channel interlocked with the primary channel.

14. The reentry vehicle of any of clauses 1-13, wherein the one or more fluid channels are positioned in proximity to a vehicle surface on a forward portion of the main body and the one or more output nozzles are positioned so that a mass flow vector, of fluid output from the one or more output nozzles, has a component in a direction extending forward from the vehicle surface and/or away from the main body.

15. A reentry vehicle comprising a main body configured for non-destructive travel through Earth atmosphere at velocities of at least 7,500 meters/second, the main body comprising forward and rear portions.

16. The reentry vehicle of clause 15, further comprising a heat exchanger comprising one or more fluid channels and positioned in proximity to a vehicle surface on the forward portion of the main body.

17. The reentry vehicle of clause 15 or clause 16, further comprising one or more output nozzles positioned so that a mass flow vector, of fluid output from the one or more output nozzles, has a component in a direction extending forward from the vehicle surface and away from the main body.

18. The reentry vehicle of any of clauses 15-17, further comprising one or more fluid paths configured to transfer heated fluid from the one or more fluid channels to one or more output nozzles.

19. The reentry vehicle of any of clauses 15-18, wherein the main body comprises one or more internal compartments.

20. The reentry vehicle of any of clauses 15-19, wherein the one or more fluid paths comprise a tank for heated working fluid, the tank connected to the heat exchanger and a pump between the tank and the one or more nozzles.

21. The reentry vehicle of any of clauses 15-20, further comprising: one or more tanks configured to store unheated working fluid for delivery to the heat exchanger; and a pump between the one or more tanks configured to store the unheated working fluid and the heat exchanger.

22. The reentry vehicle of any of clauses 15-21, wherein the heat exchanger comprises interlocking fluid channels with a primary channel and a secondary channel interlocked with the primary channel.

23. A reentry vehicle comprising a self-contained main body comprising one or more internal compartments.

24. The reentry vehicle of clause 23, further comprising a heat exchanger comprising one or more fluid channels.

25. The reentry vehicle of clause 23 or clause 24, further comprising an extendable plenum coupling the heat exchanger to the main body, the extendable plenum comprising a retracted configuration in which the heat exchanger is proximate the main body and an extended configuration in which the heat exchanger is displaced from the main body.

26. The reentry vehicle of any of clauses 23-25, further comprising one or more output nozzles.

27. The reentry vehicle of any of clauses 23-26, further comprising one or more fluid paths configured to transfer heated fluid from the one or more fluid channels to the one or more output nozzles.

28. The reentry vehicle of any of clauses 23-27, wherein the main body is configured for non-destructive travel through Earth atmosphere, from higher to lower altitude, with a starting velocity of at least 7,500 meters/second.

29. The reentry vehicle of any of clauses 23-28, wherein the one or more fluid paths comprise a tank for heated working fluid, the tank connected to the heat exchanger and a pump between the tank and the one or more nozzles.

30. The reentry vehicle of any of clauses 23-29, further comprising: one or more tanks configured to store unheated working fluid for delivery to the heat exchanger; and a pump between the one or more tanks configured to store the unheated working fluid and the heat exchanger.

31. The reentry vehicle of any of clauses 23-30, wherein the one or more output nozzles are positioned so that heated fluid output via the one or more output nozzles creates a net thrust vector, and wherein the net thrust vector has a component directed in a direction opposing a forward motion of the reentry vehicle and/or away from the main body and/or toward an outermost part of the heat exchanger.

32. The reentry vehicle of any of clauses 23-31, wherein the heat exchanger comprises interlocking fluid channels with a primary channel and a secondary channel interlocked with the primary channel.

33. A method comprising: causing a vehicle to move through a planetary atmosphere, at a starting velocity of at least 7,500 meters/second, from higher altitude to a lower altitude.

34. The method of clause 33, further comprising: heating, by transfer of heat from a region exterior to the vehicle to a working fluid in a heat exchanger coupled to the vehicle, the working fluid.

35. The method of clause 33 or clause 34, further comprising: transferring the heated working fluid to one or more output nozzles.

36. The method of any of clauses 33-35, further comprising: outputting, via the one or more output nozzles, the heated working fluid to create a net thrust vector, wherein a component of the net thrust vector is opposite to a direction of the vehicle movement through the planetary atmosphere.

37. The method of any of clauses 33-36, wherein the vehicle includes a main body configured for non-destructive travel through the planetary atmosphere.

38. The method of any of clauses 33-37, wherein the main body comprises one or more internal compartments.

39. The method of any of clauses 33-38, wherein the vehicle comprises an extendable plenum coupling the heat exchanger to the main body, and further comprising: extending the extendable plenum from a retracted configuration in which the heat exchanger is proximate the main body, to an extended configuration in which the heat exchanger is displaced from the main body.

40. The method of any of clauses 33-39, wherein the one or more output nozzles are positioned so that heated fluid output via the one or more output nozzles creates a net thrust vector, and wherein the net thrust vector has a component directed opposite to a direction from an interior of the main body to an outermost part of the heat exchanger.

41. The method of any of clauses 33-40, wherein the heat exchanger comprises one or more fluid channels positioned in proximity to a vehicle surface on a forward portion of the main body and the one or more output nozzles are positioned so that a mass flow vector, of fluid output from the one or more output nozzles, has a component in a direction extending forward from the vehicle surface and away from the main body.

42. The method of any of clauses 33-41, wherein the one or more fluid paths comprise a tank for heated working fluid, the tank connected to the heat exchanger and a pump between the tank and the one or more nozzles, and wherein the outputting the heated working fluid comprises transferring the heated working fluid from the tank to the one or more nozzles.

43. The method of any of clauses 33-42, wherein the one or more fluid paths comprise one or more tanks configured to store unheated working fluid for delivery to the heat exchanger and a pump between the one or more tanks configured to store the unheated working fluid and the heat exchanger.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. A reentry vehicle comprising:
 a main body configured for reentry into a planetary atmosphere;
 a heat exchanger comprising one or more fluid channels and positioned to transfer heat, from an exterior of the main body during the reentry, to a working fluid in the one or more fluid channels;
 one or more output nozzles;
 one or more fluid paths configured to transfer heated fluid from the one or more fluid channels to the one or more output nozzles; and
 an extendable plenum coupling the heat exchanger to the main body, wherein the extendable plenum comprises a retracted configuration in which the heat exchanger is proximate the main body and an extended configuration in which the heat exchanger is displaced from the main body.

2. The reentry vehicle of claim 1, wherein the main body is configured for travel through Earth atmosphere, from higher to lower altitude, at a starting velocity of at least 7,500 meters/second.

3. The reentry vehicle of claim 1, wherein the main body comprises one or more internal compartments.

4. The reentry vehicle of claim 1, wherein the one or more fluid paths comprise a tank for heated working fluid, the tank connected to the heat exchanger and a pump between the tank and the one or more output nozzles.

5. The reentry vehicle of claim 1, further comprising:
 one or more tanks configured to store unheated working fluid for delivery to the heat exchanger; and
 a pump between the one or more tanks and the heat exchanger.

6. The reentry vehicle of claim 1, wherein the one or more output nozzles are positioned so that heated fluid output via the one or more output nozzles creates a net thrust vector, and wherein the net thrust vector has a component directed in a direction opposing a forward motion of the reentry vehicle.

7. The reentry vehicle of claim 1, wherein the one or more fluid channels of the heat exchanger comprise interlocking fluid channels with a primary channel and a secondary channel interlocked with the primary channel.

8. The reentry vehicle of claim 1, wherein the one or more fluid channels are positioned in proximity to a vehicle surface on a forward portion of the main body and the one or more output nozzles are positioned so that a mass flow vector, of fluid output from the one or more output nozzles, has a component in a direction away from the main body.

9. A reentry vehicle comprising:
 a self-contained main body comprising one or more internal compartments;
 a heat exchanger comprising one or more fluid channels;
 an extendable plenum coupling the heat exchanger to the main body, the extendable plenum comprising a retracted configuration in which the heat exchanger is proximate the main body and an extended configuration in which the heat exchanger is displaced from the main body;

one or more output nozzles; and one or more fluid paths configured to transfer heated fluid from the one or more fluid channels to the one or more output nozzles.

10. The reentry vehicle of claim 9, wherein the main body is configured for travel through Earth atmosphere, from higher to lower altitude, at a starting velocity of at least 7,500 meters/second.

11. The reentry vehicle of claim 9, wherein the one or more fluid paths comprise a tank for heated working fluid, the tank connected to the heat exchanger and a pump between the tank and the one or more output nozzles.

12. The reentry vehicle of claim 9, further comprising:

one or more tanks configured to store unheated working fluid for delivery to the heat exchanger; and a pump between the one or more tanks and the heat exchanger.

13. The reentry vehicle of claim 9, wherein the one or more output nozzles are positioned so that heated fluid output via the one or more output nozzles creates a net thrust vector, and wherein the net thrust vector has a component directed in a direction opposing a forward motion of the reentry vehicle.

14. The reentry vehicle of claim 9, wherein the one or more fluid channels of the heat exchanger comprise interlocking fluid channels with a primary channel and a secondary channel interlocked with the primary channel.

\* \* \* \* \*